(12) United States Patent
Schoenblum

(10) Patent No.: US 7,295,610 B2
(45) Date of Patent: Nov. 13, 2007

(54) HYBRID RATE CONTROL IN A DIGITAL STREAM TRANSCODER

(75) Inventor: Joel W. Schoenblum, Alpharetta, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 736 days.

(21) Appl. No.: 10/635,406

(22) Filed: Aug. 6, 2003

(65) Prior Publication Data

US 2004/0028143 A1    Feb. 12, 2004

Related U.S. Application Data

(63) Continuation-in-part of application No. 10/397,658, filed on Mar. 26, 2003.

(60) Provisional application No. 60/368,068, filed on Mar. 27, 2002.

(51) Int. Cl.
*H04N 7/18* (2006.01)
(52) U.S. Cl. .............................. 375/240.03; 375/240.04
(58) Field of Classification Search ..............................
375/240.01–240.29
See application file for complete search history.

(56) References Cited

U.S. PATENT DOCUMENTS

| | | | |
|---|---|---|---|
| 5,426,463 A * | 6/1995 | Reininger et al. | 375/240.03 |
| 5,870,146 A | 2/1999 | Zhu | 178/405 |
| 6,058,143 A | 5/2000 | Golin | 375/240 |
| 6,081,295 A | 6/2000 | Adolph et al. | 348/405 |
| 6,141,447 A | 10/2000 | Linzer et al. | 382/236 |
| 6,167,084 A * | 12/2000 | Wang et al. | 375/240.02 |
| 6,259,741 B1 | 7/2001 | Chen | |
| 6,275,536 B1 | 8/2001 | Chen et al. | 375/240.25 |
| 6,400,763 B1 | 6/2002 | Wee | 375/240.16 |
| 6,407,681 B2 | 6/2002 | Gatepin et al. | 341/63 |
| 6,434,197 B1 | 8/2002 | Wang et al. | 375/240.29 |
| 6,441,754 B1 | 8/2002 | Wang et al. | 341/50 |
| 6,570,922 B1 | 5/2003 | Wang et al. | 375/240.12 |
| 6,628,839 B1 * | 9/2003 | Komiya et al. | 382/248 |
| 6,748,020 B1 * | 6/2004 | Eifrig et al. | 375/240.26 |
| 2003/0026491 A1 | 2/2003 | Moon et al. | 382/245 |

OTHER PUBLICATIONS

Scalable Video Transmission by Separting & Merging of MPEG-2 bitsteam. Aug. 22, 2001, pp. 17-20, Relevant to Claim No. 1-3.
"DSP-Based Transcoding of Digital Video Signals with MPEG-2 Format," Bernd Sostawa, et al.l., IEEE Transactions on Consumer Electronics, vol. 46, No. 2, May 2000, pp. 358-362.
"MPEG-2 Multi-Program Transport Stream Transcoder," Takeshi Takahashi, et al., Waseda University, Japan, pp. 1-5.
"A Frequency-Domain Video Transcoder for Dynamic Bit-Rate Reduction of MPEG-2 Bit Streams," Transaction Papers, Pedro A.A. Assuncao and Mohammed Ghanbari, IEEE Transactions on Circuits and Systems for Video Technology, vol. 8, No. 8, Dec 1998, pp. 953-967.

(Continued)

*Primary Examiner*—Andy S. Rao

(57) ABSTRACT

A rate controller in run-level domain transcoder, which receives a stream of compressed frames carried in a bit stream, selectively determines whether to quantize and/or threshold portions of a frame carried in the stream of frames. The rate controller determines the input size of the frame and based at least in part upon at least a desired size, requantizes and/or thresholds the frame such that the output size of the frame is approximately the desired size.

30 Claims, 13 Drawing Sheets

OTHER PUBLICATIONS

"Manipulation and Compositing of MC-DCT Compressed Video," Shih-Fu Chang and David G. Messerschmitt, IEEE Journal on Selected Areas in Communications, vol. 13, No. 1, Jan. 1995, pp. 1-11.

"THAM 15.5, A low-complexity MPEG-2 bit-rate transcoding algorithm," R. Klein Gunnewick, et al., 2000 IEEE, pp. 316-317.

"Local Bandwidth Constrained Fast Inverse Motion Compensation for DCT-Domain Video Transcoding," Shizhong Liu and Alan C. Bovik, The University of Texas at Austin, TX, 2001 IEEE, pp. 1609-1612.

"A Fast Algorithm for DCT-Domain Inverse Motion Compensation Based on Shared Information in a Macroblock," Junehwa Song and Boon-Lock Yeo, IEEE Transactions on Circuits and Systems for Video Technology, vol. 10, No. 5, Aug. 2000, pp. 767-775.

* cited by examiner $$\begin{bmatrix} a & 0 & 0 & c & 0 & 0 \\ b & 0 & d & g & 0 & \\ 0 & 0 & 0 & 0 & & \\ e & 0 & 0 & & & \\ f & h & & & & \\ 0 & & & & & \end{bmatrix}$$ 214

$$\begin{bmatrix} r_0=0 & l_0=a \\ r_1=1 & l_1=b \\ r_2=3 & l_2=c \\ r_3=0 & l_3=d \\ r_4=1 & l_4=e \\ r_5=0 & l_5=f \\ r_6=2 & l_6=g \\ r_7=5 & l_7=h \\ r_8=0 & l_8=0 \end{bmatrix}$$ 216

$$\begin{bmatrix} r_0=1 & l_0=a \\ r_1=1 & l_1=b \\ r_2=3 & l_2=c \\ r_3=0 & l_3=d \\ r_4=1 & l_4=e \\ r_5=0 & l_5=f \\ r_6=2 & l_6=g \\ r_7=5 & l_7=h \\ r_8=0 & l_8=0 \end{bmatrix}$$ 216

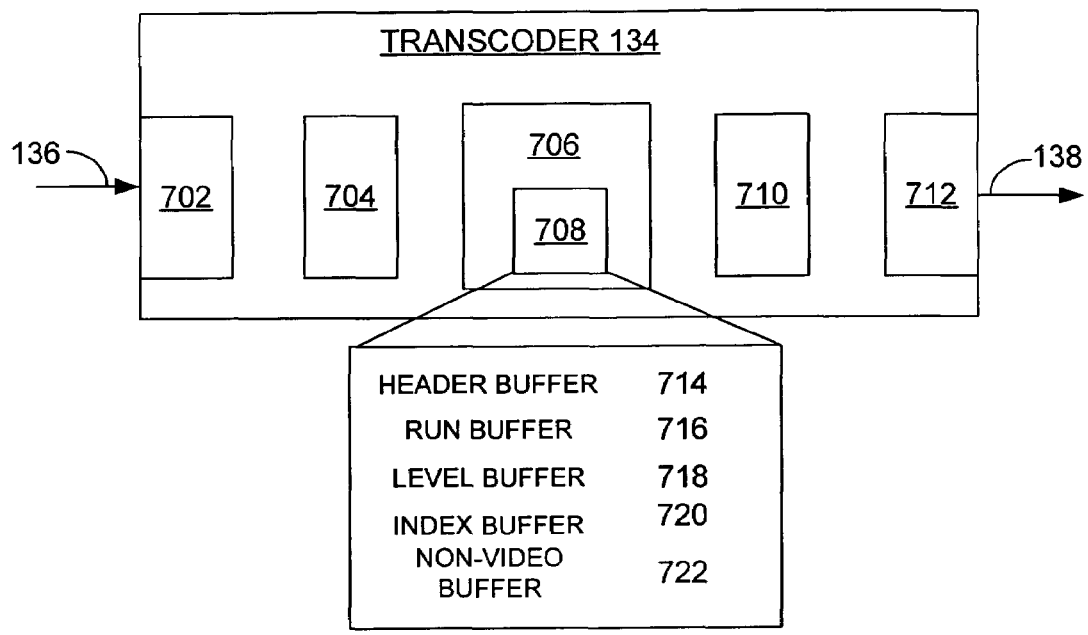
FIG. 7
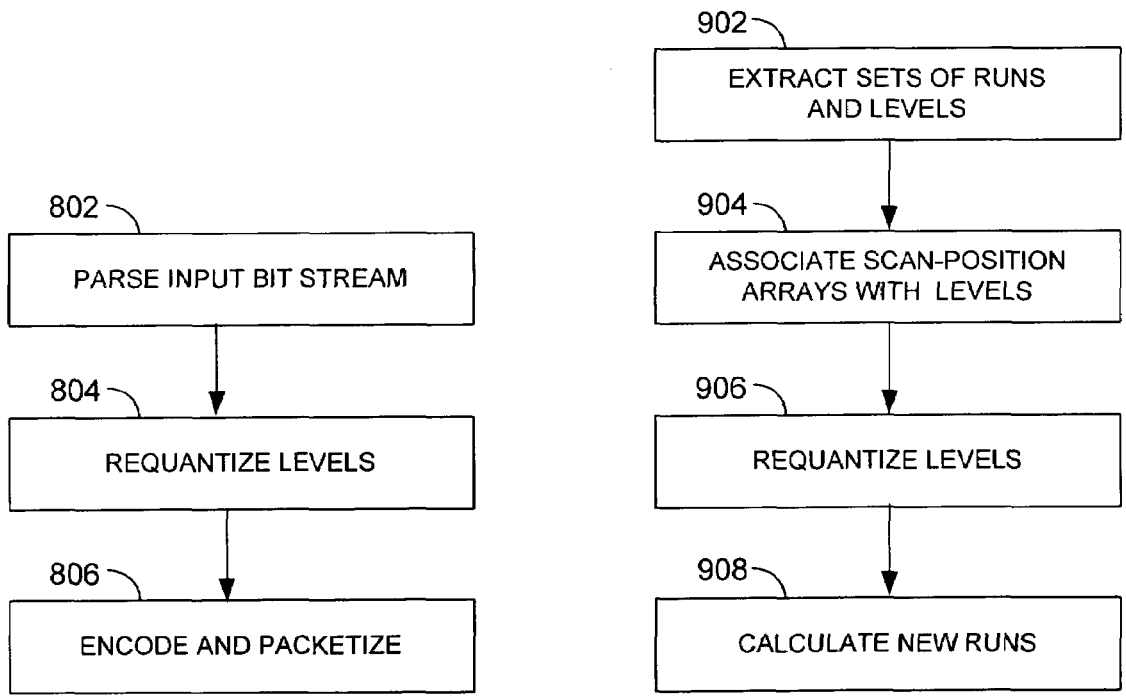
FIG. 8  FIG. 9

HYBRID RATE CONTROL IN A DIGITAL STREAM TRANSCODER

CROSS-REFERENCE TO RELATED APPLICATION

This application is a continuation-in-part of U.S. application Ser. No. 10/397,658, filed Mar. 26, 2003, which claimed priority to U.S. provisional application having Ser. No. 60/368,068, filed Mar. 27, 2002, both of which are entirely incorporated herein by reference.

TECHNICAL FIELD

The present invention is generally related to broadband communication systems, and, more particularly, is related to transcoding compressed streams of information in broadband communication systems.

BACKGROUND OF THE INVENTION

Modem subscriber television systems (STS) transmit digital content, which is packetized, from a headend to a subscriber. The digital content is typically provided in a format such as MPEG or in other packet formats known to those skilled in the art. An operator of an STS typically prefers to provide programs in digital format because digital programs provide superior fidelity and because digital programs are compressed so that they generally use less bandwidth than analog programs. Digital programs are compressed using, in part, a quantization parameter.

Frequently, the operator of an STS may want to convert a compressed digital signal of a given bit rate into a compressed digital signal of a lower bit rate by using a conventional transcoder to change the quantization parameter. A conventional transcoder used for such a purpose consists of a cascaded decoder and encoder. This combination is rather complex and expensive. In the particular case of video signals, some other aspects have to be taken into account. A coded video signal consists of a succession of encoded video-frames, where each video-frame is subdivided into a two-dimensional array of macroblocks, each macroblock being composed of blocks. A video-frame may be in the spatial domain, which is the pixel domain, and is transmitted in the frequency or transform domain, which results from a Discrete Cosine Transform (DCT) of the video-frame in the spatial domain. In addition, a video-frame may be separated into two fields: the top field formed by the odd lines of the video-frame and the bottom field formed by the even lines of the video-frame. A macroblock may be conveyed in two different formats: an interlaced format and a de-interlaced format. In the interlaced video-frame format, a macroblock is composed of lines from the two fields alternately and each DCT-block of the macroblock is formed by data from the two fields. In the de-interlaced format, a macroblock is composed of lines from the two fields, and each DCT-block of the macroblock is formed by data from only one of the two fields. Each DCT-block of a video-frame is scanned and encoded.

Before a conventional pixel-domain transcoder can requantize a bit stream, the decoder portion of the transcoder converts the bit stream into pixel domain values. The encoder portion of the transcoder then requantizes and converts the pixel domain values back into DCT-domain values.

In addition to conventional pixel-domain transcoders, there exist conventional DCT-block domain transcoders, which operate in the DCT-block domain. Such a transcoder receives a bit stream and converts the bit stream into sets of run-level pairs, where a set of run-level pairs is a compressed representation of a DCT-block, and then converts the sets of run-level pairs into DCT-blocks. The transcoder manipulates information in the DCT-block domain and then reconverts the DCT-blocks back into sets of run-level pairs, which are then converted back into a compressed bit stream. Further details regarding DCT-block domain transcoders can be found in "A Frequency-Domain Transcoder For Dynamic Bit-Rate Reduction of MPEG-2 Bit Streams," Assuncao et. al., IEEE Transactions on Circuits and Systems for Video Technology, Vol. 8, Issue 8, December 1998, pages 953-967, which is hereby incorporated by reference in its entirety; and "Manipulation and Compositing of MC-DCT Compressed Video," Chang et al., IEEE Journal on Selected Areas In Communications, Vol. 13, No. 1, 1995, pages 1-11, which is hereby incorporated by reference in its entirety.

Both the pixel-domain and DCT-block domain transcoders operate on full 8×8 blocks of data. In the DCT-domain the DCT blocks are sparsely populated, since most of the elements in the block are zero. Typically, no more than six of the sixty-four elements in the block have a non-zero value. Therefore, what it is sought is a transcoder that operates in the run-level domain because of the large computational savings that result from operating the transcoder in the more compressed run-level domain than in the expanded pixel or DCT-block domains and that can compress a frame of information to an approximate desired size.

BRIEF DESCRIPTION OF THE DRAWINGS

The preferred embodiments of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 4A is a diagram of a quantized matrix.

FIG. 4B is a diagram of a set of run-level pairs for the quantized matrix illustrated in FIG. 4A.

FIG. 4C is a diagram of a set of run-level pairs for the quantized matrix illustrated in FIG. 4A.

FIGS. 5A and 5B are illustrative pictures from a sequence of pictures.

FIG. 6A is a partial picture of the picture illustrated in FIG. 5B.

FIG. 6B is a residual picture.

FIG. 7 is a block diagram of a transcoder.

FIG. 8 is a flow chart of steps taken in processing a digital stream.

FIG. 9 is a flow chart of steps taken in requantizing a digital stream.

DETAILED DESCRIPTION OF THE PREFERRED EMBODIMENTS

Figure 1:
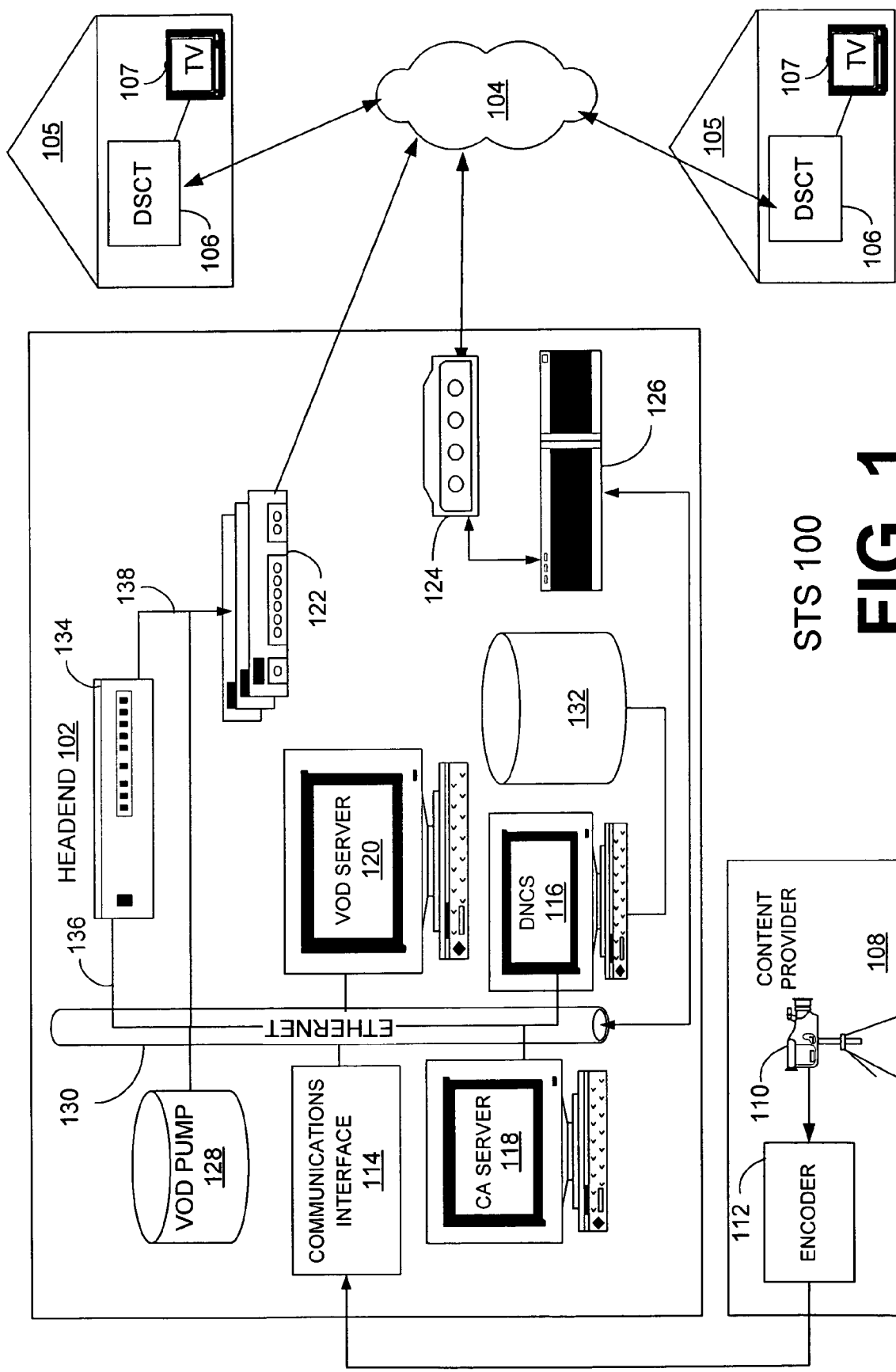
FIG. 1 is a block diagram of a broadband communications system, such as a subscriber television system, in which the preferred embodiment of the present invention may be employed.

Preferred embodiments of the present invention will be described more fully hereinafter with reference to the accompanying drawings in which like numerals represent like elements throughout the several figures, and in which several exemplary embodiments of the invention are shown. The present invention may, however, be embodied in many different forms and should not be construed as limited to the embodiments set forth herein. The examples set forth herein are non-limiting examples and are merely examples among other possible examples.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention One way of understanding the preferred embodiments of the invention includes viewing them within the context of a subscriber television system (STS). Thus, the preferred embodiments of the invention include, among other things, systems and methods for decreasing the size of transport streams carried by an STS by requantizing in the run-level domain blocks of video information.

Because the preferred embodiments of the invention can be understood in the context of a subscriber television system environment, an initial description of a subscriber television system (STS) is provided, which is then followed by a description of select components that are included within a headend of the subscriber television system. Also, a run-level domain transcoder, which implements preferred embodiments of the invention and which is included in the headend at the headend, is described.

The preferred embodiments of the invention may, however, be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" given herein are intended to be non-limiting, and are provided as an exemplary list among many other examples contemplated but not shown.

Furthermore, it should be noted that the logic of the preferred embodiment(s) of the present invention can be implemented in hardware, software, firmware, or a combination thereof. In the preferred embodiment(s), the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), a digital signal processor (DSP) etc. In addition, the scope of the present invention includes embodying the functionality of the preferred embodiments of the present invention in logic embodied in hardware or software-configured mediums.

Subscriber Television System

FIG. 1 is a block diagram depicting a non-limiting example of a subscriber television system (STS) 100. In this example, the STS 100 includes a headend 102, a network 104, and multiple digital subscriber communication terminals (DSCTs) 106, which are located at subscriber premises 105.

It will be appreciated that the STS 100 shown in FIG. 1 is merely illustrative and should not be construed as implying any limitations upon the scope of the preferred embodiments of the invention. For example, the STS 100 can feature a plurality of any one of the illustrated components, or may be configured with alternative embodiments for any one of the individual components or with yet other additional components not enumerated above. Subscriber television systems also included within the scope of the preferred embodiments of the invention include systems utilizing and not utilizing physical structured cabling for transmission, such as, but not limited to, satellite systems.

A DSCT 106, which is located at a subscriber's premises 105, provides among other things, a two-way interface between the headend 102 of the STS 100 and the subscriber. The DSCT 106 decodes and further processes the signals for display on a display device, such as a television set (TV) 107 or a computer monitor, among other examples. Those skilled in the art will appreciate that in alternative embodiments the equipment for first decoding and further processing the signal can be located in a variety of equipment, including, but not limited to, a computer, a TV, a monitor, or an MPEG decoder, among others.

At least one content provider 108 provides the STS 100 with digital content, which is formatted in a protocol such as, but not limited to, MPEG. Among other things, a content provider 108 can be a television station that provides "live" or "recorded" programming. A television station will include a camera 110 and an encoder 112. The encoder 112 receives content from the camera 110 and processes the content into an MPEG format, which is then provided to the headend 102 of the STS 100.

The headend 102 receives programming signals from the content providers 108, and, after processing the content from the content providers 108 according to mechanisms described hereinbelow, the headend 102 transmits programming signals to the DSCTs 106 at the subscriber premises 105. Typically, the headend 102 transmits conventional analog signals, which will not be discussed, and digital signals.

In one implementation, the digital signals are transmitted in MPEG format and embodiments of the present invention will be discussed in terms thereof. Specifically, embodiments of the present invention are described in terms of MPEG video-frames and video-fields. However, it is to be understood that describing embodiments of the present invention employing MPEG video-frames and video-fields is merely for exemplary and clarity purposes and is not a limitation on the scope of the present invention. The scope of the present invention is intended to extend to at least to all streams of quantized information. For the purposes of this disclosure a frame of information includes video-frames, top video-fields, bottom video-fields, and other predetermined blocks of information.

As shown in FIG. 1, selected components of the example headend 102 include a communications interface 114, a digital network control system (DNCS) 116, a conditional access (CA) server 118, a video-on-demand (VOD) server 120, a transport stream transmitter 122, a quadrature phase shift keying (QPSK) modem 124, a router 126, a VOD pump 128, and a run-level domain transcoder 134, which are connected via an Ethernet 130. It will be understood by those having ordinary skill in the art that the exemplary headend 102 can include additional components, such as additional servers, switches, multiplexers, transport stream transmitters, among others, or can omit some of the shown selected components.

Among other things, the DNCS 116 manages, monitors, and controls network elements and the broadcast of services provided to users. The DNCS 116 includes, among other modules, a subscriber database 132 that includes information about the subscribers for such purposes as billing information and survey data, among others. The DNCS 116 also communicates with the conditional access server 118 to provide for secure transmittal of content from the headend 102 to the DSCTs 106.

The CA server 118 selectively provides "entitlements" to the DSCTs 106 for the services and programming of the STS 100. In other words, among other things, the CA server 118 determines which DSCTs 106 of the STS 100 are entitled to access a given instance of service or program and provides the selected DSCTs 106 with the necessary keys and authorizations, among other things, to access the given instance of service. In addition, the CA server 118 informs the DNCS 116 of the entitlements of each of the DSCTs 106 in the STS 100 so that each subscriber can be properly billed. Furthermore, the CA server 118 includes a database (not shown) that includes, among other things, long term keys, the public keys of the DSCTs 106 and a private key for the CA server 118. The CA server employs long-term keys, public and private keys to securely communicate with the DSCTs 106.

The CA server 118 also provides encryption information to the transport stream transmitter 122 and to the selected DSCTs 106. The transport stream transmitter 122 employs the encryption information to encrypt the content of a program and transmits modulated programming, among other things, to the DSCTs 110 via the network 104.

The QPSK modem 124 is responsible for transporting the out-of-band IP (Internet protocol) datagram traffic between the headend 102 and the DSCT 106. Data transmitted or received by the QPSK modem 124 may be routed by the headend router 126. Among other things, the headend router 126 may be used to deliver upstream data to the various servers, such as the VOD server 120.

The run-level domain transcoder 134 receives a bit stream 136 that carries a stream of MPEG transport packets and outputs a bit stream 138. The bit size of the output bit stream is lower than the input bit stream 136. The run-level domain transcoder 134 is adapted to receive operator input and, among other things, apply a hybrid requantization-thresholding scheme on the frames of a program carried by the input bit stream 136. The hybrid requantization-thresholding scheme is performed in the run-level domain and is done such that the frames are reduced in bit size.

MPEG Compression

Before describing the run-level domain transcoder 134 in detail, a brief description of MPEG video compression is provided. Further details of MPEG compression and MPEG in general can be found in MPEG-1 standards (ISO/IEC 11172), the MPEG-2 standards (ISO/IEC 13818) and the MPEG-4 standards (ISO/IEC 14496) are described in detail in the International Organization for Standardization document ISO/IEC JTC1/SC29/WG11 N (June 1996 for MPEG-1, July 1996 for MPEG-2, and October 1998 for MPEG-4), which are hereby incorporated by reference.

Typically, a video frame is segmented into horizontal slices, which can extend across the width of the frame or a fraction thereof. Each slice is made up of macro-blocks, which are 16×16 pixels in size. When a frame is encoded, headers such as a Picture header, slice headers, and macro-block headers are used to carry information regarding frame and how the frame was processed. The pixel information of each macro-block is processed and is compressed using either spatial coding or temporal compression.

MPEG-2 employs three types of pictures, I-picture, B-picture, and P-picture. I-pictures are pictures that are intra-coded, i.e., compressed using only spatial compression from that video-frame, which means that they are decompressed without reference to any other video-frame. B-pictures and P-pictures are pictures that are inter-coded, i.e., compressed using information from a reference picture such as an I-picture or a P-picture, and are also spatially compressed. P-pictures are "predicted" pictures using information from a previous reference picture, and B-pictures are "bi-directionally predicted" pictures using information from a previous reference picture and from a subsequent reference picture. In practice, a B-picture or a P-picture is not strictly an inter-coded picture, but is instead a combination of inter-coded macro-blocks and intra-coded macro-blocks. Macro-blocks that can be predicted from reference pictures are inter-coded and those cannot be predicted are intra-coded. Each macro-block has a macro-block header associated with it, and the macro-block header identifies the macro-block as being an inter-coded or intra-coded macro-block.

A typical sequence of video pictures in display order is I(1), B(2), B(3), P(4), B(5), B(6), P(7), B(8), B(9), P(10), . . . P(N), I(N+1). The P-picture P(4) uses information from the I-picture I(1); the B-pictures B(2) and B(3) use information from the I-picture I(1) and P-picture P(4); the P-picture P(7) uses information from the P-picture P(4); and the B-pictures B(5) and B(6) use information from the P-pictures P(4) and P(7). The pictures between I(1) and P(N), inclusive, are known as a group of pictures (GOP) and typically number between 12-16, inclusive. Video pictures are not transmitted in display order. Instead, each inter-coded picture is transmitted after all of its reference pictures have been transmitted. Thus, the transmission order for a GOP is I(1), P(4), B(2), B(3), P(7), B(5), B(6), P(10), B(8), B(9), . . . P(N), B(N–2), B(N–1).

In a typical picture for display on a television, a high quality National Television System Committee (NTSC) frame is made up of approximately 1350 macro-blocks. Common MPEG-2 standards include 4:2:0 and 4:2:2. In the 4:2:0 standard, a 16×16 macroblock is represented by four 8×8 luminescent blocks and two 8×8 color difference blocks, which are generated by down sampling each axis by a factor of 2. In the 4:2:2 standard, the chroma is not down sampled, and consequently there is twice as much chroma information. Thus, in the 4:2:0 standard, a 16×16 macroblock is represented by six 8×8 blocks, and in the 4:2:2 standard, a 16×16 macroblock is represented by eight 8×8 macroblocks. All of the 8×8 blocks of a macro-block are steered from a reference picture (I-picture or P-picture) to a temporally compressed picture (P-picture or B-picture) by a common motion vector.

Figure 2:
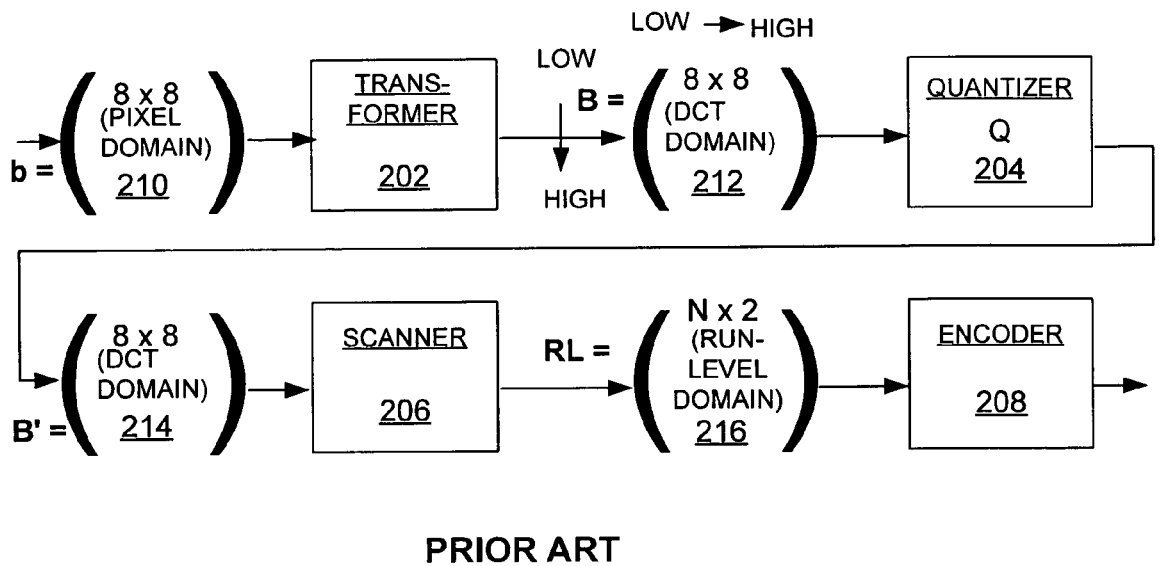
FIG. 2 is block diagram of an encoder.

Spatial compression in MPEG-2 is based upon transforming each macro-block using a two dimensional discrete cosine transform (DCT) on each of the 8×8 blocks to convert from the pixel domain to the frequency domain, also known as the DCT domain. The steps in which an MPEG encoder, such as encoder 112, spatially compresses frames are illustrated in FIG. 2. The encoder 112 includes a transformer 202, a quantizer 204, a scanner 206, and a binary encoder 208. The transformer 202 transforms each block of pixel information 210 of a picture into a DCT domain block 212 using a discrete cosine transform. The pixel domain block 210 is written as a matrix b, whose elements are given as b(n,m), where n and m range from 0 to 7, inclusive. The DCT domain block 212 is written as a matrix B, whose elements are given as B(k,j), where k and j range from 0 to 7, inclusive. The transformer 202 uses the following equation to transform from pixel domain to DCT domain:

$$B(k, j) = \frac{c(k)}{2} \frac{c(j)}{2} \sum_{n=0}^{7} \sum_{m=0}^{7} b(n, m) \cos\left(\frac{(2n+1) \cdot k\pi}{16}\right) \cos\left(\frac{(2m+1) \cdot j\pi}{16}\right), \quad (1)$$

where $c(0)=1/\sqrt{2}$ and $c(n)=1$ for $n>0$.

The zero-frequency (DC) component, B(0,0), is in the top left corner of DCT domain matrix 212 and the coefficient for the highest frequencies, B(7,7), is in the bottom right hand corner of the DCT domain matrix 212.

The DCT coefficients are not treated equally because the human eye is less responsive to high frequencies than low frequencies. Consequently, the quantizer 204 applies a weight factor to each of the DCT coefficients while quantizing them. Quantization converts the DCT coefficients from rational numbers into integers and usually results in a sparse representation of the quantized DCT coefficients, i.e., one in which most or a large percentage of the amplitudes of the coefficients are equal to zero. In one implementation, the quantizer 204 employs the following weight-quantization scheme:

$$B'(k,j)=\text{int}([2B(k,j)+1] \cdot Q \cdot w(k,j)/16, \quad (2a)$$

for inter-coded blocks and $$B'(k,j)=\text{int}(2B(k,j) \cdot Q \cdot w(k,j)/16, \quad (2b)$$

for intra-coded block, where int( ) is the integer function, w(k,j) is the weight factor for element (k,j), and Q is the quantization parameter. An MPEG decoder would then employ the following inverse weight-quantization scheme:

$$B(k,j)=\text{nint}(B'(k,j) \cdot 16 \cdot Q/w(k,j)), \quad (3)$$

where nint( ) is the nearest integer function. Those skilled in the art recognize that other quantization schemes, which will not be discussed, but are intended to within the scope of the invention, can also be used.

The scanner 206 performs a zig-zag scan on the quantized DCT matrix (B') 214 and produces a run-level domain matrix (RL) 216, which has the dimensions of (N+1)×2, where N is the number of non-zero coefficients in the quantized DCT matrix (B') 214. Finally, a binary encoder 208 converts the run-level pairs of the run-level domain matrix (RL) 216 into a bit stream using Huffman coding. It should be remembered that the preferred embodiments of the invention are being described in terms of MPEG standards, which use Huffman coding. However, the present invention is not intended to be limited to only MPEG standards and other coding techniques known to those skilled in the art can be uses in other preferred embodiments.

Figure 3A:
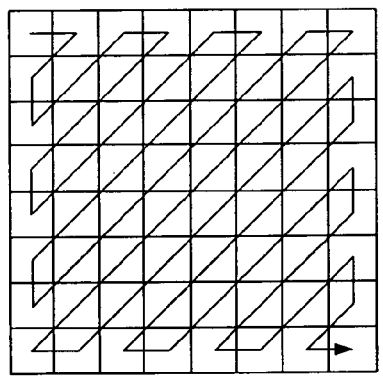
FIGS. 3A and 3B are diagrams of zig-zag scan order.
Figure 3B:
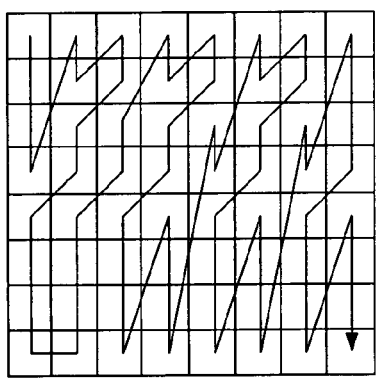

FIGS. 3A and 3B illustrate two possible scan orders that are used in scanning MPEG frames. Other protocols might employ different scan orders and such scan orders are intended to be within the scope of the present invention. The scan order illustrated in FIG. 3A is typically implemented by the scanner 206 for scanning the quantized DCT matrix (B') 214 when the DCT matrix represents a portion of a non-interlaced video-frame. FIG. 3B illustrates the scan pattern that is typically implemented when the DCT matrix represents a portion of an interlaced video-fields.

FIG. 4A illustrates an exemplary quantized DCT-domain matrix (B') 214, and FIG. 4B illustrates the corresponding run-level domain matrix (RL) 216 after the scanner 206 has employed the scan pattern illustrated in FIG. 3A on the exemplary DCT-domain matrix 214. In the run-level domain, "run" refers to the number of consecutively scanned coefficients having the value of zero that precede a non-zero coefficient, and "level" refers to the amplitude of the non-zero coefficients. The number of coefficients having the value of zero preceding the zero-frequency (D.C.) coefficient (B(0,0)=a) is zero, and thus the run-level pair for the D.C. coefficient is (0, a). The only zero coefficient interposing B(0,0) and B(1,0) is B(0,1), and thus the run-level pair for B(1,0) is given by (1, b ). All of the coefficients following the B(4,1) coefficient (B(4,1)=h) are zero and are represented by an end-of-block marker, denoted by the run-level pair (0,0). Thus, after processing by the quantizer 204 and the scanner 206, the 64 coefficients in the DCT domain matrix (B) 212 are now represented by nine pairs of runs and levels (18 integers). The conversion of 64 numbers into 18 integers (levels) reduces the number of bits necessary to represent the exemplary DCT-domain matrix 214.

FIG. 4C illustrates an alternative embodiment of a set of run-level pairs 216. In intra-coded macro-blocks, MPEG-2 treats DC levels, the B(0,0) element of matrix 214, differently from the higher frequency levels. The DC level of an intra block is encoded separately from the AC coefficients since the DC coefficient is differentially coded from block to block and because the human eye is more responsive to lower frequencies. Thus, there is no run value associated with the DC level because by definition that run would have to be zero. DC levels of inter-coded blocks are treated the same other levels.

An MPEG decoder such as the DCT 106 performs inverse operations to convert a bit stream into frames. The MPEG decoder has a binary decoder (not shown) that, among other things, converts a bit stream into sets of run-level pairs, where a set of run-level pairs represents an 8×8 block of pixels. An inverse scanner (not shown) converts sets of run-level pairs into 8×8 matrices of DCT quantized coefficients. An inverse quantizer (not shown) multiplies the levels by the quotient of the quantization factor Q divided by the weight factor for each of the levels. Lastly, an inverse transformer (not shown) transforms the levels back into pixel domain values. Thus, MPEG encoding and decoding involve a lot of computational complexity due to, among other things, the matrix operations and DCT transformation and inverse transformations.

As previously stated, P-pictures and B-pictures are partially compressed by using information from at least one reference frame. In a sequence of pictures, there is normally a lot of redundant information that does not change substantially from one picture to the next. Bandwidth can be saved by sending motion information that is used to map portions of a reference frame into an inter-coded frame and then adding a correction or residual. The concept of inter-coding is illustrated in FIGS. 5-6.

FIGS. 5A and 5B are illustrative pictures 502A and 502B, respectively, in a sequence of pictures. Each of the pictures 502A and 502B are divided into blocks 504, which are numbered 1-25. In the picture 502A, an ascending airplane 506 is in blocks 504 that are labeled 1, 2, 6 and 7, a cloud 508 is in blocks 504 that are label 8, 9, 13 and 14, and sky (not shown) is background in all of the 25 blocks. In the picture 502B the airplane 506 is passing in front of the cloud 508. Much of the information of picture 502B such as the background sky is contained in picture 502A, and the picture 502B can be roughly generated by appropriate translations of blocks from the reference frame into a partial picture.

In FIG. 5B, the blocks 13, 14, 15, and 20 are examples of inter-coded blocks because information from blocks 1, 2, 6, and 7 of FIG. 5A is used to generate the airplane 506. FIG. 5B also shows the nose of a second plane 510 entering block 5. Block 5 is an example of an intra-coded block because it cannot be predicted from any of the blocks of picture 502A.

FIG. 6A illustrates a partial picture 602. In the partial picture 602, the airplane 506 is generated by referencing frame 502A and using motion vectors to translate the plane 506 from blocks 1, 2, 6 and 7 into blocks 13, 14, 15 and 20. The dashed box 604 represents the blocks 1, 2, 6 and 7 of frame 502A and illustrates how the plane 506 can be reconstructed by motion information referencing the frame 502A.

After the encoder has generated a partial representation of picture 502B, a residual frame 606, which is illustrated in FIG. 6B, is generated. The residual frame 606 is the difference between the actual picture 502B and the partial picture 602. The dashed outline 608 of the airplane represents the difference between the actual airplane 506 of the frame 502B and the translated airplane 506 of the partial picture 602. The difference compensates for factors such as change of lighting and perspective. Thus, picture 502B is temporally compressed by sending motion vectors that translate specific blocks 504 from a reference frame, in this case frame 502A, and the residual frame 606. The residual frame 606 is compressed using the spatial compression techniques described hereinabove.

Run-Level Domain Transcoding

Referring to FIG. 7, the run-level domain transcoder 134 includes an input buffer 702, a vector length decoder (VLD) 704, a processor 706, a memory 708, a vector length encoder (VLE) 710, and an output buffer 712. The input buffer 702 receives the bit stream 136 and provides the bit stream to the VLD 704. Among other things, the VLD 704 parses headers such as the picture headers, slice headers, macroblock headers, which include motion vectors, and others from the bit stream and provides the headers to the memory 708.

In addition, the VLD 704 also parses non-video frames of information and provides the non-video frames to the memory 708 and parses run-level pairs from the bit stream and provides the run-level pairs to the memory 708. The memory 708 includes a header buffer 714, a run buffer 716, a level buffer 718, an index buffer 720, and a non-video frame buffer 722. The header buffer 714 includes information from the headers of the MPEG packets such as, but not limited to, picture headers, slice headers, and macroblock headers. The run buffer 716 has sets of runs stored therein, and the level buffer 718 has the sets of levels associated with the sets of runs stored therein. For the purposes of this disclosure, a set of run-level pairs represents an 8×8 block of DCT coefficients, which in turn are related to a block of pixel values. Stored in the index buffer 720 are scan position arrays which are explained hereinbelow.

The processor 706 processes frames in the run-level domain so that, among other things, a processed frame may be represented by fewer bits. In the preferred embodiment, the processor 706 processes multiple sets of run-level pairs in parallel.

In one preferred embodiment of the invention, the processor 706 is a general-purpose processor. In alternative embodiments, the processor 706 could be, but is not limited to, a digital signal processor (DSP), an FPGA, an ASIC, or any combination of these processing elements.

After processing a frame of information in the run-level domain, the processor 706 sends the processed frame to the VLE 710. As those skilled in the art will recognize, processor 706 controls the processing of frames such that the VLE receives video and non-video frames in the same sequence that the frames were received by the input buffer 702.

Among other things, the VLE 710 converts the processed frame into binary information and encapsulates the binary information into multiple MPEG packets. The VLE 710 converts run-level pairs from pairs of integer values into binary sequences using well-known techniques such as, but not limited to, Huffman coding.

The output buffer 712 receives MPEG packets from the VLE 710 and transmits the MPEG packets in the binary stream 138.

It should be emphasized that the preferred embodiments of the present invention are improvements over conventional transcoders, which require many more mathematical operations to process a frame because, among other things, a conventional transcoder expands the frame. A conventional transcoder that transcodes an MPEG stream is essentially, in general terms, a cascaded MPEG decoder-encoder pair. The MPEG decoder portion of a conventional transcoder receives a bit stream and a VLD processes the bit stream to, among other things, recover therefrom sets of run-level pairs. The levels of each set are then inverse quantized, i.e., multiplied by the quotient of the initial quantization parameter ($Q_1$) divided by a weight factor. Next, each set of run-level pairs is inverse scanned, i.e., converted from a N×2 matrix into an 8×8 matrix of levels (DCT coefficients). Next, an inverse DCT operation transforms the DCT coefficients back into pixel domain values. Reference frames in pixel domain representation are stored so that they can be used to generate complete pixel domain frames of inter-coded compressed frames. The pixel domain frames are sent from the MPEG decoder portion of the conventional transcoder to the MPEG encoder portion of the conventional transcoder.

In the MPEG encoder portion of a conventional transcoder, an adder subtracts portions of pixel domain reference frames from inter-coded frames to generate the residual frames. Pixel domain reference frames and residual frames are transformed into DCT coefficients by a DCT module. Each block of 8×8 DCT coefficients is then requantized using a new quantization parameter $Q_2$, thereby converting real numbers into integers, i.e., levels. Next, each 8×8 block of levels is then scanned and converted into sets of run-level pairs. A VLE module receives, among other things, header information and run-level pairs and processes its inputs into MPEG packets.

In addition, after a reference frame has been requantized, the requantized reference frame is converted back into pixel domain information and buffered so that it can be used to help generate subsequent inter-coded frames. Specifically, the requantized levels are also sent to an inverse quantization module, which then multiplies levels by the quotient of the $Q_2$ parameter divided by appropriate weighting factor. An inverse DCT module receives the blocks of levels and transforms the blocks of levels back into pixel domain values. If the reference frame is an intra-coded frame, e.g., an I-picture, the reference frame is stored in a buffer. If the reference frame is a inter-coded frame, e.g., a P-picture, the motion compensation is applied such that pixels of the residual frame are added to pixel values that have been taken from a previous reference frame to generate the actual inter-coded reference frame, which is then stored in a buffer. Thus, requantizing a bit stream using a conventional transcoder involves many operations and inverse operations and initialization operations. For example, prior to performing the inverse scan operation, the entire 64 element DCT block must be initialized, i.e., set to zero, to prepare for filling the block with new data. For the 4:2:0 video standard, the initialization for the inverse scan operation alone would require approximately $15.5 \times 10^6$ operations per second for a high resolution NTSC frame. The number of operations per second is calculated using the following equation:

$$N_{op} = N_{block} \times N_{MB} \times 64 \times f = 15.5 \times 10^6 \quad (4)$$

where $N_{blocks}$ equals 6, $N_{MB}=1{,}350$, the number of macroblocks per frame, and f=30 frames per second.

FIG. 8 is a flow chart of steps taken by the run-level domain transcoder 134 for implementing requantization of a received MPEG stream. In step 802, the VLD 704 parses, among other things, the header information, motion information, non-video frames, from MPEG packets and provides the parsed information to the memory 708. The VLD 704 also decodes the binary representation of sets of run-level pairs into integer sets of run-level pairs and provides the runs and levels of a set to the memory 708, where they are buffered in buffers 716 and 718, respectively.

In step 804, the processor requantizes sets of run-level pairs of the current frame by multiplying the quantized levels by the ratio of $Q_1/Q_2$, where $Q_1$ is the old quantization factor and $Q_2$ is the new quantization factor. The processor also updates macroblock headers and slice headers of the current frame. Macroblock headers include fields for, among other things, Coded Block Pattern (CBP), Macroblock Type (MBTYPE), Macroblock Address Increment (MBINC), and Quantization Scale Code (QSC), which are updated after requantization. The QSC is always present in the slice header and, optionally, may be present in the macroblock header. When the quantization scale is changed, it is necessary to update the appropriate header, which may be a slice header or a macroblock header. If the requantization is done on a set of run-level pair by set of run-level pairs basis, then the quantization scale is changed for in the macroblock headers. Whereas, if the requantization is done on a slice of blocks, then the quantization scale is changed in the slice header.

In step 806, the VLE 710 encodes run-level pairs and encapsulates frames in MPEG packets.

FIG. 9 illustrates exemplary steps implemented by the processor 706 in step 804. In step 902, the processor 706 extracts at least one set of runs and levels from buffers 716 and 718, respectively.

In step 904, the processor 706 associates a scan-position array with each extracted set of run-level pairs. A scan-position array has the maximum dimension of 64 elements, which corresponds to the maximum size of the levels in the pairs in a set of run-level pairs. The elements of the scan-position array are the scan position of the non-zero levels, i.e., DCT coefficients.

In step 906, the processor applies a requantization technique to the levels. An example of a requantization technique is given by the following equation:

$$l_2 = NINT(l_1 \times Q_1 / Q_2), \quad (5)$$

where NINT( ) is the nearest-integer operation, $Q_1$ is the initial quantization parameter, $Q_2$ is the new quantization parameter, and $l_1$ is the value of the level before requantization.

In step 908, the processor 706 determines the runs for the requantized levels. Some of the levels will have changed to zero, and consequently, some new run values need to be determined. However, it should be emphasized that the new run values are determined without expanding the updated levels into an 8×8 matrix or equivalently into a 64×1 matrix.

Figure 10A:
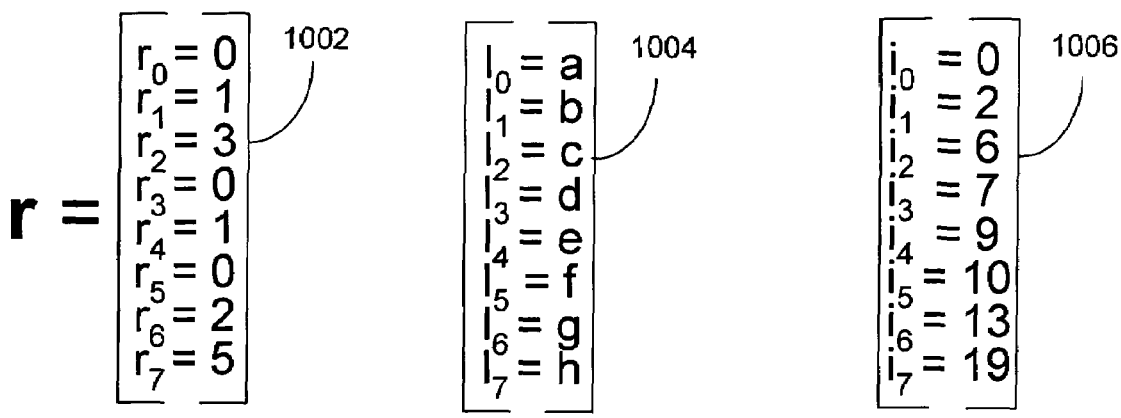
FIG. 10A shows block diagrams of a run array, level array, and scan-position array.

A set of run-level pairs and its associated scan-position array are illustrated in FIG. 10A as run array 1002, level array 1004, and scan-position array 1006. The run array 1102 and level array 1104 correspond to the DCT-matrix illustrated in FIG. 4A. The subscript of each of the array elements gives the position of that element for its particular array. The value of each non-zero element in the scan-position array is the position of the associated level in the zig-zag scan order starting from zero. The VLD 704 calculates the scan position for each element of the scan-position array using the following equations:

$$i_n = r_n + i_{n-1} + 1, \quad (6a)$$

for n>0, and $$i_n = r_n, \quad (6b)$$

for n=0.

Figure 10B:
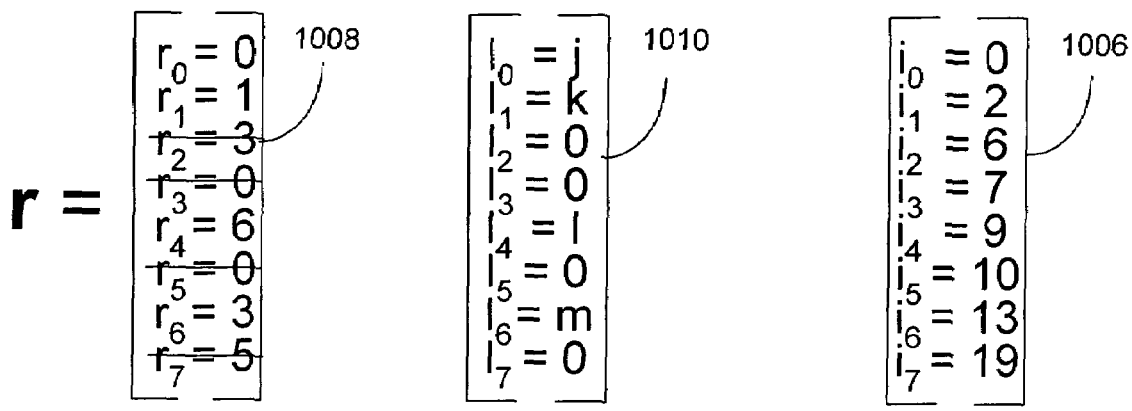
FIG. 10B shows block diagrams of the run array, the level array, and the scan-position array illustrated in FIG. 10A after requantization.

FIG. 10B illustrates a temporary run array 1008, a temporary level array 1010, and the scan-position array 1006 after requantization, where the runs that have been struck out are associated with levels that have been set to zero. The processor 706 calculates new run values for the temporary run array 1008 using the following equations:

$$r'_n = i_n - i_{n-k(n)-1} - 1, \quad (7a)$$

for k(n)<n, and $$r'_n = i_n, \quad (7b)$$

for k(n)=n, where k(n) is the number of levels that were zeroed in the temporary level array 1010 interposing the $n^{th}$ element and the first preceding non-zero element. For example, k(4)=2 because level $l_1$ is not zero and levels $l_2$ and $l_3$ have been set to zero. Runs that correspond to levels that are zeroed by requantization are ignored.

Figure 10C:
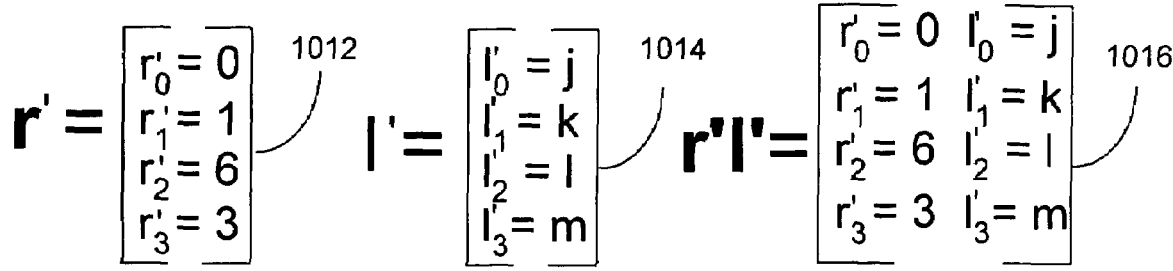
FIG. 10C shows block diagrams of an updated run array, an updated level array, and an updated scan-position array.

FIG. 10C illustrates an updated run array 1012, an updated level array 1014, and corresponding set of run-level pairs 1016. The updated run array 1012 corresponds to the new run values illustrated in FIG. 10B, and the updated level array 1014 corresponds to the non-zero requantized levels illustrated in FIG. 10B.

In one preferred embodiment, instead of receiving the updated set of run-level pairs 1016, the VLE 710 receives the temporary run array 1008 and temporary level array 1010. The VLE 710 is adapted to ignore runs that are associated with levels that have been set to zero. Thus, in the exemplary arrays illustrated in FIG. 10B, the VLE 710 only Huffman encodes the run-level pairs $(r_0, l_0), (r_1, l_1), (r_4, l_4)$ and $(r_6, l_6)$. This embodiment does not require reformatting the size of the buffers for the updated run array 1012 and the updated level array 1014.

It should be noted that tremendous computational efficiencies are had by using the scan-position array in calculating the new run values. The updated runs are computed using single-instruction-multiple-data techniques (parallel processing) on a programmable digital signal processor (DSP).

Working in the run-level domain instead of the pixel domain or DCT-block domain provides for increased computational efficiency. As previously noted, just initializing the inverse DCT matrix requires approximately $15.5 \times 10^6$ operations per second for high quality NTSC frames. Because we are working in the run-level domain instead of the pixel domain, these initialization operations do not need to be performed. As another example of increased efficiency consider operations for quantization. Take for example a 3-megabit per second (mbits/s) NTSC MPEG-2 bit stream with an average number of DCT coefficients of 30,000 per picture. Assuming two operations per requantized coefficient in equation 5, requantization requires an operation count of $30,000 \times 2 \times 30 = 1.8 \times 10^6$ operations per second. Whereas, for a conventional transcoder the number of operations per second for inverse quantizing or requantizing would be $6 \times 64 \times 1,350 \times 30 \times nq = 15,552,000$ nq operations per second where nq is the number of operations for quantizing of a coefficient. The number of operations for quantization or inverse quantization depends upon the quantization/inverse quantization scheme that is implemented, but when the quantization scheme of equation 2 is implemented, nq is approximately 3 or 4, and consequently, for a conventional transcoder, requantization requires approximately $47 \times 10^6$ - $62 \times 10^6$ operations.

Run-Level Domain Thresholding

In one preferred embodiment, the bit size of the frames are reduced by selectively zeroing levels in sets of run-level pairs, as opposed to zeroing through requantization. In this embodiment, the processor 706 determines which levels in a set of run-level pairs are to be zeroed and those levels are then set to zero. After setting those levels to zero, the processor 706 then determines new run values using equation 7. The processor 706 is adapted to determine which levels to selectively set to zero using criteria such as level magnitude and frequency. The processor 706 selectively zeros levels of a set of run-level pairs using a threshold function that selectively zeros levels based upon both amplitude and frequency. Because the human eye is more responsive to lower frequencies than higher frequencies, the threshold for zeroing high frequency levels is different from the threshold for low frequency level so that the high frequency levels are more predominately zeroed.

Run-Level Domain Rate Control

Figure 11:
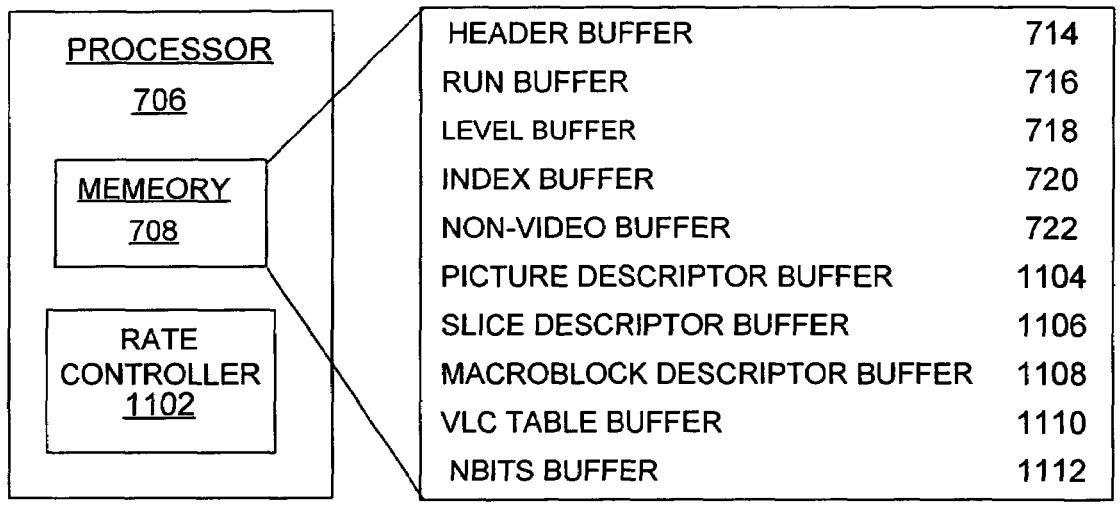
FIG. 11 is a block diagram of the processor in the transcoder.

Referring to FIG. 11, in one preferred embodiment, the processor 706 includes a rate controller 1102. In addition to the run buffer 716, the level buffer 718, the index buffer 720, and the non-video buffer 722, which were previously described hereinabove, the memory 708 also includes a picture descriptor buffer 1104, a slice descriptor buffer 1106, a macro block descriptor buffer 1108, a vector-length-code (VLC) table buffer 1110, and an N-bits buffer 1112. Stored in the VLC table buffer 1110 are specific codes that represent particular pairs of runs and levels. Stored in the N-bits buffer 1112 are the sizes of each of specific codes stored in the VLC table buffer 1110. When the processor 706 receives a video frame, the processor 706 parses the frame and buffers the picture header, and the macroblock headers in their respective buffers 1104, 1106, and 1108. In addition, the processor 706 processes the slice headers and the macroblock headers to determine various quantities such as the maximum quantization parameter (Q1MAX) that was last used to quantize the levels included in the slice, and the average quantization parameter (Q1AVG) that was last used to quantize the levels included in the slice. Furthermore, the processor 706 processes the sets of run-level pairs for each slice and calculates various quantities such as the average of the runs (Run_avg) and the average of the absolute value of the levels (LAVG). For each slice, the processor 706 also uses the index buffer 720 to calculate the average of the scan positions (IAVG).

The rate controller 1102 implements logic for a hybrid requantization/thresholding scheme for reducing the bit size of a frame such that the reduced bit size of the frame is approximately equal to a desired bit size ($N_D$). Usually the desired bit size ($N_D$) is provided to the transcoder 134 by the DNCS 116 or by an operator using a user interface (not shown), or by a frame-layer rate control algorithm which determines the number of bits in each picture frame based upon a target bit rate set by an operator.

Figure 12:
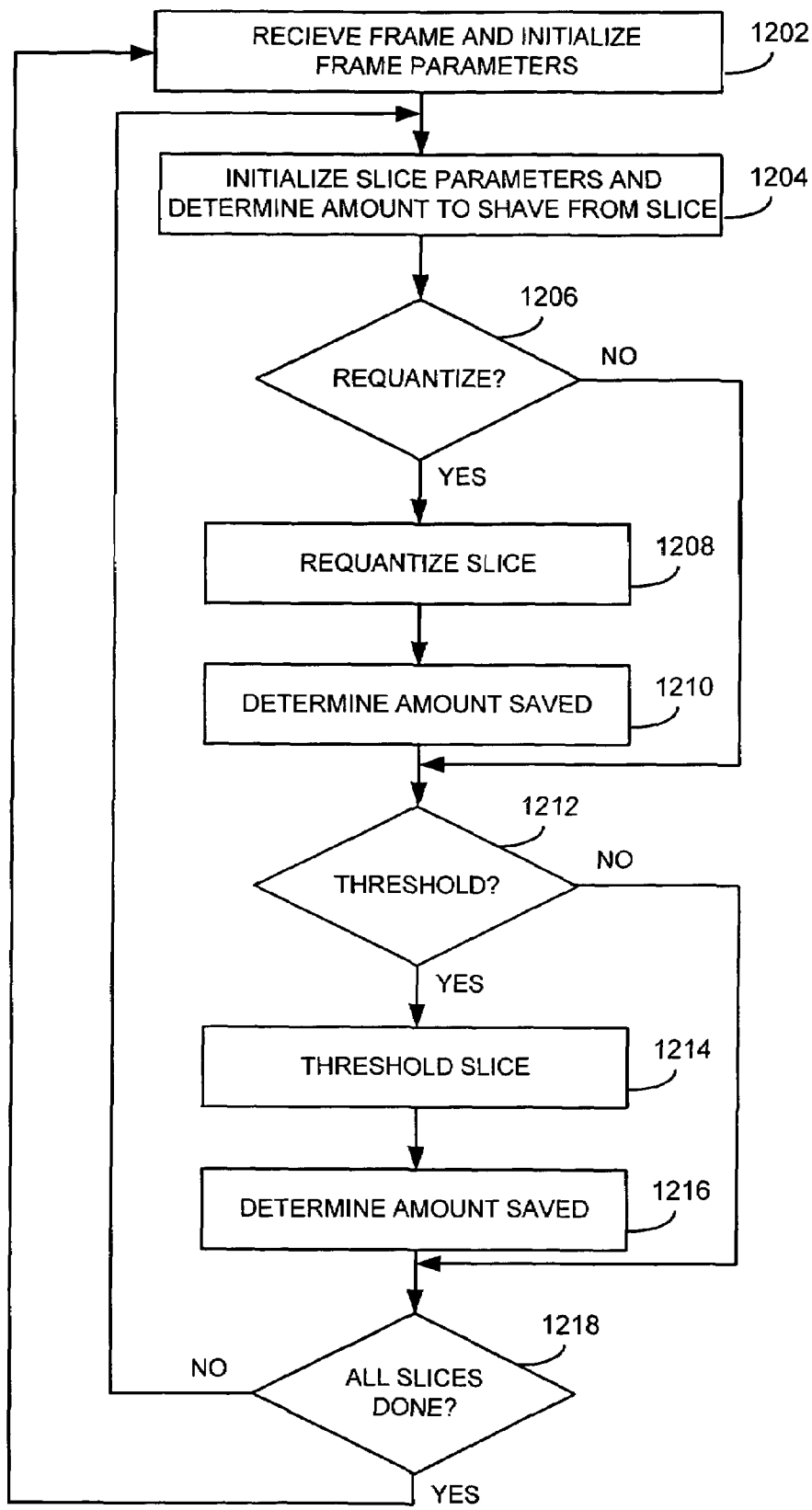
FIG. 12 is a flow chart of steps taken implementing requantization/thresholding.

FIG. 12 illustrates exemplary requantization-thresholding logic implemented by the processor 706. In step 1202, a frame is received by the processor 706. The frame is parsed and buffered in memory 708. The rate controller 1102 implements the hybrid requantization-thresholding scheme on a slice-by-slice basis, and, in one preferred embodiment, the sets of run-level pairs in a slice are handled in parallel. Typically, the processor 706 processes a slice in a working buffer (not shown), while retaining the initial values of the slice in memory 708. As those skilled in the art will recognize, the slice is an arbitrary portion of a picture and other smaller or larger portions of a picture may be utilized and are within the scope and intent of the invention. For example, a media processor or digital signal processor may have an internal cache which limits the portion of the picture which can be processed using the techniques set forth below.

The rate controller 1102 initializes parameters that are used in processing the entire frame such as an accumulated reduction error (E), and picture-type (P_T), among others. The type of picture, I-picture, P-picture or B-picture, is determined from the picture header, which is stored in picture descriptor buffer 1104. Among other things, the rate controller 1102 also determines the number of slices ($N_{SLICE}$) in the frame and the total size ($N_T$) of the frame and the total content size ($C_T$) of the frame. For the purposes of this disclosure, a frame shall be considered to consist of two types of information: content information and non-content information. The content information is the aggregate of the sets of run-level pairs of the frame, and the non-content information is everything else: picture headers, slice headers, micro-block headers, motion vectors, etc. Furthermore, for the purposes of this disclosure, the total size ($N_T$) of the frame is defined as the size of the frame when the frame is compressed, and the total content size ($C_T$) of the frame is defined as the compressed bit size of the content information, i.e., all of the run-level pairs. The rate controller 1102 also determines the amount of bits that need to be shaved off the frame ($N_S$), where amount to shave off is defined as the difference between the desired bit size ($N_D$) and the total bit size ($N_T$), $N_S = N_T - N_D$.

In step 1204, the rate controller 1120 determines quantities such as the slice content size, $S_{SIZE}(K)$, and a reduction threshold, $R_T$, and initializes slice quantities such as $N_{SAVED}(K)$, which is described hereinbelow. For the purposes of this disclosure, the content size, $S_{SIZE}(K)$, is defined as the compressed bit size of all of the run-level pairs for the Kth slice of the frame. To determine $S_{SIZE}(K)$, the rate controller 1102 checks the VLC table buffer 1110 for each run-level pair (J) in the slice to determine whether the VLC table buffer 1110 includes a specific code representing that pair, and if so, the rate controller 1102 uses the N-bits buffer 1112 to determine the compressed bit size ($VLC_j$) of that specific code. Some possible run-level pairs are not included in the VLC table buffer 1110, and such run-level pairs are represented in 24 bits, a 6 bit escape sequence followed by six bits for the run and 12 bits for the level. Thus, the slice content size, $S_{SIZE}(K)$, is given by the following equation:

$$S_{SIZE}(K) = \sum_{J=0}^{N_{coef}(K)-1} VLC_J + 24 \times N_{ESCAPE}, \quad (8)$$

where Ncoef(K) is the number of levels in the slice, $VLC_J$ is the compressed bit size of the $j^{th}$ run-level pair, which is zero if the $j^{th}$ run-level pair is not one of the specific codes found in the VLC table buffer 1110, and $N_{ESCAPE}$ is the number of run-level pairs in the slice that are not found in the VLC table buffer 1110.

The rate controller 1102 also determines the amount of bits to reduce from the Kth slice, $N_{SHAVE}(K)$, which is given as $$N_{SHAVE}(K) = S_{SIZE}(K) \times \frac{N_S}{C_T} + \frac{E}{N_{SLICE} - K}, \quad (9)$$

where $N_{SLICE}$ is the number of slices in the frame, K ranges from zero to $N_{SLICE}-1$, and the accumulated reduction error (E) is the accumulated difference between the desired bit reduction and the actual bit reduction for previous slices.

The reduction threshold ($R_T$) is give by the following equation:

$$R_T = \frac{N_{SHAVE}(K)}{S_{SIZE}(K)} \quad (10)$$

In step 1206, the rate controller 1102 determines whether to requantize the slice. Generally, the decision whether or not to requantize is based at least in part upon a requantization threshold parameter (T) and the reduction threshold ($R_T$). The requantization threshold parameter (T) is provided to the transponder 134 by the DNCS 116 or by an operator, or is computed by a frame-layer rate control algorithm. Typically, if $R_T$ is greater than T then the slice is requantized. Other factors such as picture type and/or the initial quantization parameters used in quantizing the slice, among others, may also be used in the determination on whether to requantize or not. If the decision is not to requantize, the rate controller 1102 proceeds to step 1212, otherwise, the rate controller proceeds to step 1208.

In step 1208, the rate controller 1102 requantizes the sets of run-level pairs of the current slice. In one preferred embodiment, the sets of run-level pairs of the slice are requantized in parallel using techniques previously described herein.

In step 1210, after the slice has been requantized, the rate controller 1102 determines the number of bits saved by requantization. The rate controller 1102 uses the VLC table buffer 1110 to determine the new codes for the requantized run-level pairs and the N-bits buffer 1112 to determine the number of bits for the codes. For the Kth slice of the current frame the number of bits saved is given by the following equation:

$$N\_saved(K) = S_{SIZE}(K) - \left( \sum_{J=0}^{N_{coef}(K)-1} VLC\_NEW_j + N\_escape_{new} \times 24 \right) \quad (11)$$

where $VLC\_NEW_J$ is the compressed bit size of the new $j^{th}$ run-level pair, which is zero if the new $j^{th}$ run-level pair is not one of the specific codes found in the VLC table buffer 1110, and $N\_escape_{new}$ is the new number of run-level pairs in the slice that are not found in the VLC table buffer 1110.

Next in step 1212, the rate controller 1102 determines whether to the threshold the slice. Typically, the thresholding decision is based at least upon the number of bits saved, N_saved (K), which was initialized to zero in step 1204 and calculated in step 1210. If the number of bits saved, N_saved (K), is greater than or equal to the amount of bits to shave, N_shave(K), from the slice, the rate controller 1102 proceeds to step 1218. On the other hand, if N_saved(K) is less than N_shave (K), the rate controller 1102 proceeds to step 1214 and thresholds the slice. Further details of the thresholding are provided hereinbelow.

Next, in step 1216, the rate controller 1102 determines the amount of bits saved, N_saved(K). The amount of bits saved is the difference between the number of bits used to represent the slice in compressed format, e.g., using Huffman code, and the initial size of the slice in compressed format. Typically the amount of bits saved will not exactly match the desired number of bits to shave from a slice, and the difference from the two values is added to the accumulated reduction error (E), which is given as E=E+N_shave(K)−N_saved (K). The accumulated reduction error, E, is used in equation to calculate of the number of bits to shave from the next slice.

In step 1218, the rate controller 1102 determines whether all of the slices of the frame have been processed, and if so, returns to step 1202. Otherwise, it returns to step 1204 and processes the next slice in the current frame. The processing described hereinabove was described in terms of processing a slice of the frame. However, those skilled in the art will recognize that in alternative embodiments, sets of run-level pairs, which do not define a slice of the frame, could be handled in parallel, or sets of run-level pairs could be processed sequentially. All such embodiments are intended to be within the scope of the current invention.

Figure 13:
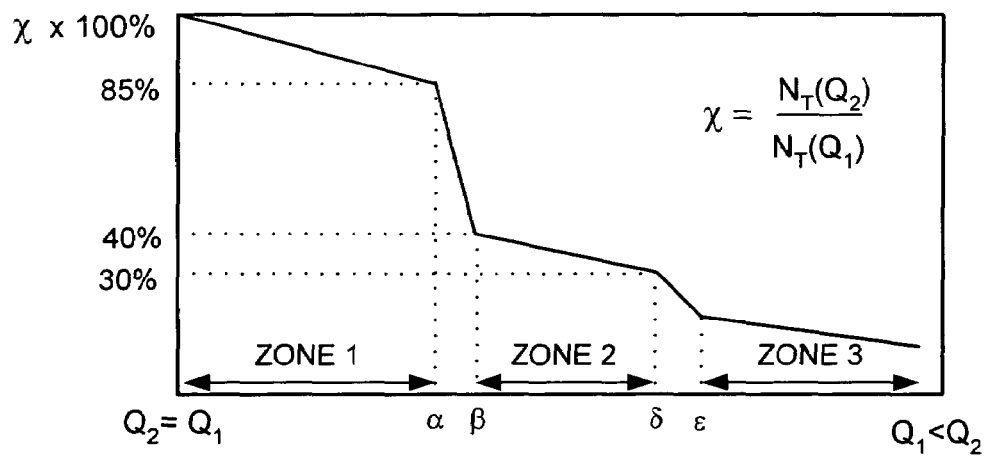
FIG. 13 is a graph of bit saving versus requantization parameter.

Before discussing the thresholding in detail, a description of how the determination of the requantization parameter is determined. FIG. 13 is a graph of χ versus the requantization parameter $Q_2$, where χ is defined as the quotient of the total size of the representative frame after requantization divided by the total size of the representative frame before requantization. In the region labeled zone 1, the magnitude of $Q_2$ increases from $Q_1$, which is the original quantization parameter, up to approximately α, which is equal to 31 if a linear quantization scale is used, and 112 if a non-linear quantization scale is used for the picture. The rate of change of χ with respect to $Q_2$ ($d102/dQ_2$) is discontinuous at $Q_2 = α$, β, δ, and ε and is approximately constant between each of the discontinuities. The region between $Q_2 = Q_1$ to $Q_2 = α$ is defined as zone 1 and throughout this region there is only an approximate 15% reduction in the size of the requantized frame. In the region defined as zone 2, which extends from $Q_2 = β$ to $Q_2 = δ$, the requantized frame is reduced by approximately 60%-70%, and in the region defined as zone 3, which extends outward from $Q_2 = ε$, the requantized frame is reduced at least by approximately 75%. The results shown in FIG. 13 is for a representative frame. The actual amount of reduction can vary depending upon variables such as the content of the frame, the type of picture, and other variables. Even so, FIG. 13 illustrates that it is normally preferable to use a requantization parameter from zone 2 (or zone 3) as opposed to zone 1, because requantization in zone 1 does not produce a significant saving in size.

As those skilled in the art will recognize, as the requantization parameter $Q_2$ is increased, information is lost due to the requantization, which results in a lower quality of picture for the viewer. Thus, a balance between picture quality and size must be struck by the choice of requantization parameter $Q_2$. Preferably, the requantization parameter $Q_2$ is not chosen from zone 1 because such a parameter only reduces the size of the requantized frame by at most approximately 15%. Instead, it is preferable that thresholding is used for such small decreases in the size of the frame. If requantization is performed, then in one preferred embodiment, the requantization reduces the size of the current frame to approximately the desired size, $N_D$, and then thresholding is performed to further reduce the size such that the total size of the frame is even closer to the desired size.

Table 1 lists adjustable parameters, which are provided by the DNCS 116, or the operator, that are used by the rate controller 1102 in determining whether to requantize. The adjustable parameters include the requantization threshold parameter (T), which in the preferred embodiment is an array, a quantization threshold array QT, which is a function of picture type (P_T), and LMIN, which is parameter associated with the average of the absolute value of the levels in the slice.

TABLE 1

| Parameter | Example Value |
|---|---|
| T(0) | 0.30 |
| T(1) | 0.40 |
| T(2) | 0.50 |
| T(3) | 0.60 |
| T(4) | 0.70 |
| QT(0, P_T) | n/a |
| QT(1, P_T) | 7 for P_T = I or P Picture, 9 for P_T = B picture |
| QT(2, P_T) | 9 for P_T = I or P Picture, 11 for P_T = B picture |
| QT(3, P_T) | 12 for P_T = I or P Picture, 14 for P_T = B picture |
| $L_{min}$ | 1 |

Figure 14:
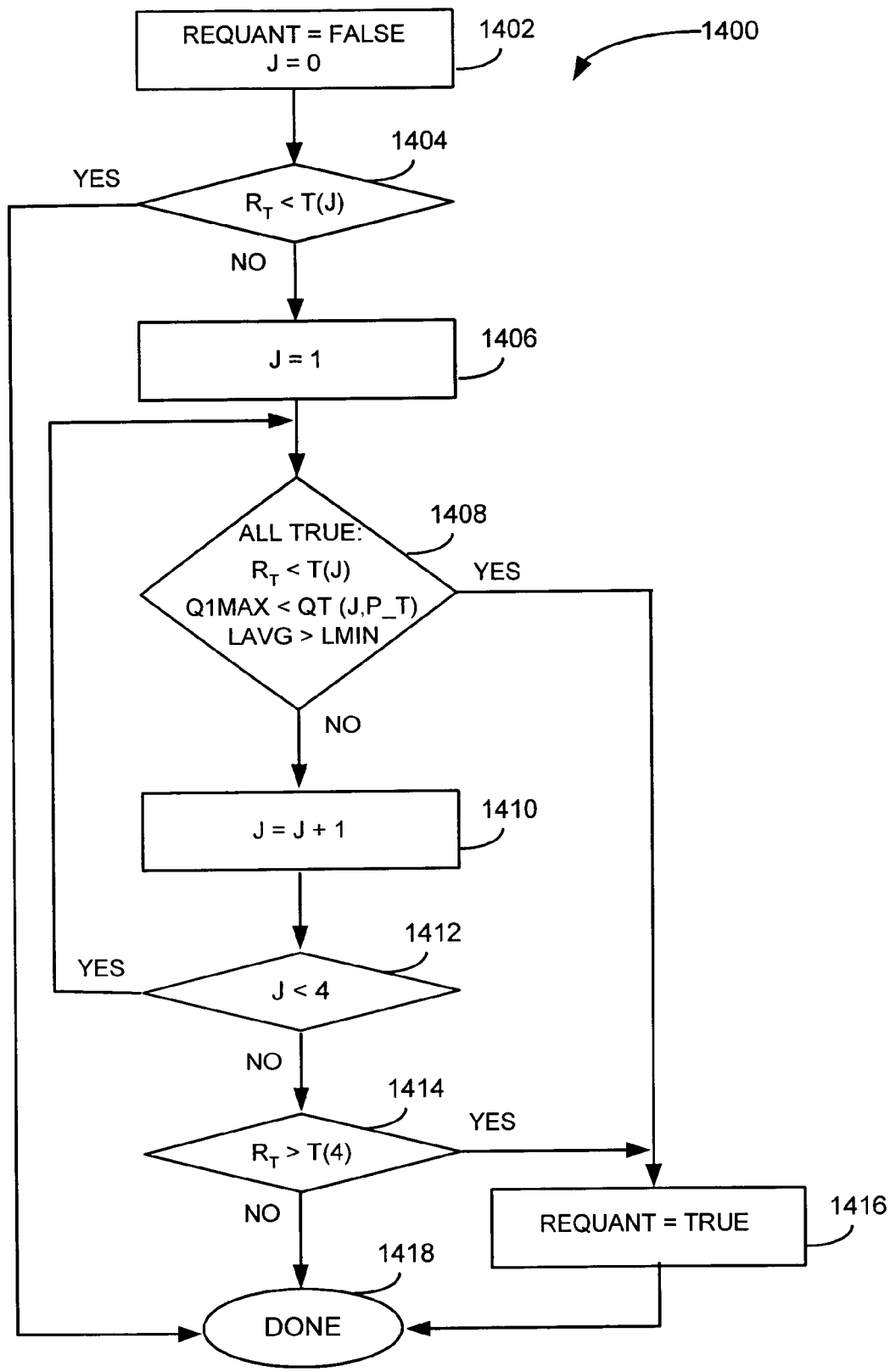
FIG. 14 is a flow chart of steps taken to determine whether to requantize.

FIG. 14 further illustrates exemplary steps 1400 for determining whether to requantize the current frame implemented by the rate controller 1102 in step 1206. In step 1402, a requantization flag is set to the default position of "false", and a counter, "J," is initialized to zero. Next in step 1404, the rate controller 1102 determines whether the reduction threshold, $R_T$, is less than the requantization threshold parameter T(J) for J=0. If the condition $R_T<T(0)$ is true, the rate controller 1102 drops to step 1418 and is finished, which in this case means that requantization is not performed because the reduction threshold is small enough that the current frame will be reduced to approximately the desired size by thresholding only. On the other hand, if the condition $R_T<T(0)$ is false, the rate controller 1102 proceeds to step 1406.

In step 1406, the rate controller 1102 increments the counter J, and in step 1408, the rate controller 1102 determines whether all of the following conditions are true: (i) $R_T<T(J)$; (ii) $Q1MAX<Q_2(J,P\_T)$; and (iii) LAVG>LMIN, where Q1MAX is the maximum quantization parameter that was used to requantize the DCT blocks corresponding to the sets of run level pairs that make up the slice, and LAVG is the average of the absolute value of the levels that make up the slice. When the average absolute level of the slice LAVG is equal to 1, this means that at least half the levels of the slice have an absolute level of 1. Therefore, requantization by a factor of $2Q_1$ will necessarily zero half or more of the levels of the slice. Thus, in this situation, it is preferable to use thresholding instead of requantization to reduce the size of the slice. Only if all three conditions are true does the rate controller 1102 proceed to step 1416. On the other hand, if at least one of the three conditions is false, the rate controller 1102 proceeds to step 1410 and increments the counter "J". In step 1412, the rate controller 1102 determines whether the counter J is less than 4. The rate controller 1102 loops over steps 1408, 1410 and 1412 until either all three conditions of step 1408 are true or until J=4.

In step 1412, which is reached when J=4, the rate controller 1102 determines whether the reduction threshold RT is greater than the requantization threshold parameter T(4). If so, the rate controller 1102 proceeds to step 1416 and sets the requantization flag to "true". If the condition $R_T>T(4)$ is not met, the rate controller 1102 drops to the last step 1418 and is finished with the requantization flag still set to the default "false". However, if the rate controller 1102 reached step 1416 from either step 1408 or 1414, the requantization flag is set to "true," and then the rate controller 1102 drops to the last step 1418 and is finished.

Referring back to step 1408, the three conditions of step 1408 are exemplary conditions for determining whether or not to requantize. The three conditions are used so that the various factors such as the maximum initialization quantization parameter and picture type are included in the decision along with the reduction threshold and the average of the absolute value of the levels of the slice. Those skilled in the art will recognize that the conditions listed hereinabove are non-limiting lists and that other conditions or more conditions or fewer conditions beyond those listed hereinabove for selectively determining whether to requantize can also be used.

In one preferred embodiment, the requantization parameter $Q_2$ for a set of run-level pairs is typically chosen to be $2Q_1$ or $4Q_1$, where $Q_1$ is the initial quantization parameter for the set of run-level pairs. Choosing the requantization parameter $Q_2$ to be either $2Q_1$ or $4Q_1$ is done for computational efficiency, and the determination of whether to use $2Q_1$ or $4Q_1$ is based at least in part on the desired size of the requantized frame. However, it should be noted that the choice of $2Q_1$ or $4Q_1$ is a matter of implementation, and in alternative embodiments, the requantization parameter $Q_2$ can be any quantization parameter. Typically, the default position is for $Q_2$ to equal $2Q_1$, but if the condition $R_T > T(4)$, or some other predetermined value, is true, then the value of $Q_2$ is chosen such that $Q_2 = 4Q_1$. By choosing the requantization parameter $Q_2$ to be either $2Q_1$ or $4Q_1$, the requantization parameter $Q_2$ is chosen from zones 2 or 3 of FIG. 13, respectively. Furthermore, it should be remembered that each set of run-level pairs of the current slice may not have been quantized with the same initial quantization parameter, and in that case, each set of run-level pairs is requantized using a requantization parameter that is a multiple of its initial quantization parameter, preferably $Q_2 = 2Q_1$ or $4Q_1$. Alternatively, the entire slice can be requantized using a common requantization parameter such as $Q_2 = 2Q1max$.

Figure 15:
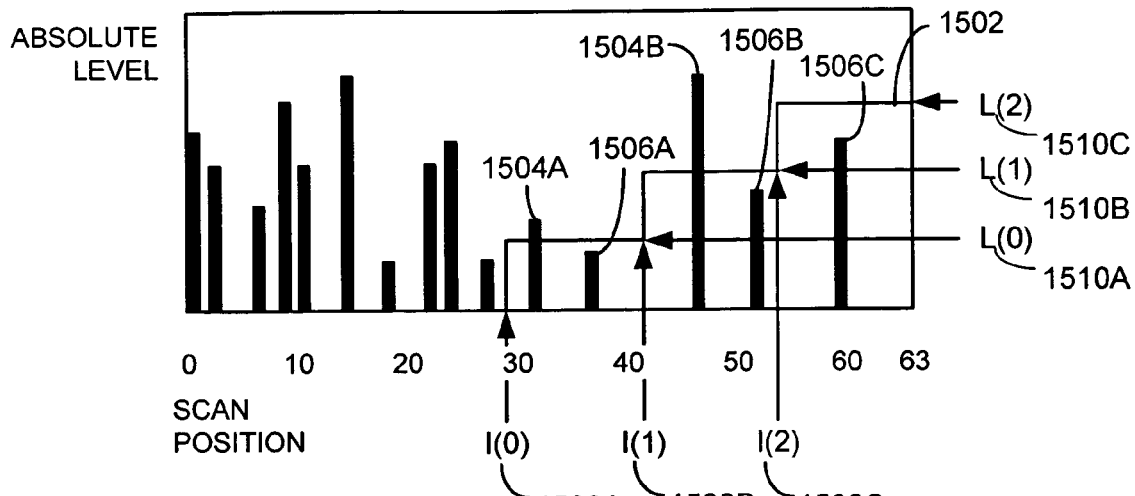
FIG. 15 is a diagram of a threshold function.

FIG. 15 illustrates an exemplary threshold function 1502, which is a staired function having scan index thresholds 1508, which are labeled I(0) through I(2), and level thresholds 1510, which are labeled L(0) through L(2). The rate controller 1102 zeros levels that are beneath the threshold function 1502. The level labeled 1506A, whose scan position is between the scan index thresholds I(0) and I(1), is zeroed because its absolute value is less than the level threshold L(0), which extends between the scan index thresholds I(0) and I(1). On the other hand, level 1504A is not zeroed because its absolute value exceeds the level threshold L(0). Similarly, the level labeled 1504B is not zeroed, and the levels labeled 1506B and 1506C are zeroed. In one preferred embodiment, the rate controller 1102 thresholds the levels of the slice in parallel. In this embodiment, all of the sets of run level pairs that make up the slice are each thresholded by the same threshold function. Conceptually, as will be described in detail hereinbelow, the rate controller 1102 moves the threshold function 1502 horizontally and vertically so that the correct number of levels are zeroed such that size of the slice is reduced by approximately the appropriate amount.

Figure 16:
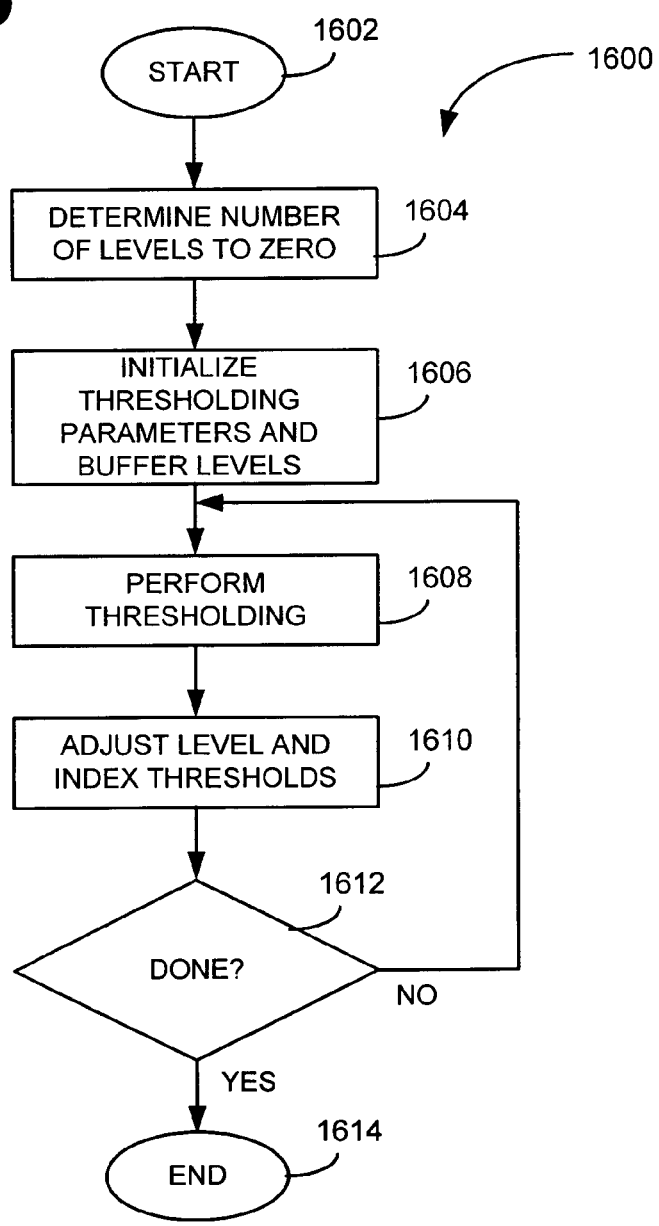
FIG. 16 is a flow chart of steps taken to threshold.

Referring to FIG. 16, steps 1600 illustrate an exemplary method to threshold the levels of a slice. The method starts at step 1602. In step 1604 the rate controller 1102 determines the approximate number of levels (N_thresh(K)) that need to be zeroed so that the size of the slice will be approximately the desired size after thresholding. The following equation is used to determine N_thresh(K) for the Kth slice of the current frame:

$$N\_thresh(K) = \frac{(Ncoef(K) - R_K) \times R_T \times A(\text{Run\_avg}(K))}{S_{SIZE}(K)}, \quad (10)$$

where Ncoef(K) is the number of levels in the Kth slice, $R_K$ is the number of levels that were zeroed by requantization, Run_avg(K) is the average run value of the Kth slice, and A( ) is a weighting function having Run_avg(K) as its argument. It should be noted that $R_K$ is initialized to zero in step 1204, and if requantization is performed, $R_K$ is tabulated in step 1208. The weighting function A( ) strengthens the relationship from bits to levels as a function of the run average in the slice. Typically, as the average of the runs increases, the applied weight changes. For example, for an average run of zero, the run level pairs are coded efficiently using VLC, and consequently, A(0) is empirically determined to be approximately in the range of 1.2. Whereas, when the average of the runs is four, the run level pairs are not efficiently coded using VLC, and in that case, A(4) is empirically determined to be approximately in the range of 0.8.

In one preferred embodiment, the weighting function A( ) is adjusted in step 1216 based upon the actual bits saved by thresholding. This enables on-line learning/feedback of the weighting function A( ) as a function of the average of the runs.

Next, in step 1606, thresholding parameters are initialized, and the levels of the slice are buffered.

In step 1608, the rate controller 1102 performs thresholding on the levels of the slice based upon the current position of the threshold function. The rate controller 1102 determines which levels of the current slice are beneath the threshold function and zeros those levels.

In step 1610, the rate controller 1102 adjusts the threshold function by moving it vertically or horizontally so that the number of zeroed levels are closer to the value of N_thresh (K), or the rate controller 1102 determines not to adjust the threshold function.

In step 1612, the rate controller 1102 determines whether it is done with thresholding. If the rate controller 1102 is finished, the method ends in step 1614. Otherwise, the method loops back to step 1608. Each time step 1608 is entered, the levels of the slice are reset according to the buffered levels of step 1606.

Typically, the number of levels that are set to zero by thresholding will not exactly be equal to the desired value of N_thresh(K) or within a predetermined range of the desired value of N_thresh(K). Thus, in one preferred embodiment, the rate controller 1102 partitions the sets of run level pairs into a first group and a second group. The rate controller 1102 then adjusts the threshold function for each group independently. If the total number of zeroed levels in the first and second group is still not within a predetermined range of N_thresh(K), the rate controller 1102 transfers a predetermined number of levels from the second group into the first group. The rate controller 1102 continues to transfer levels from the second group into the first group, determine the number of threshold levels, and if the number of threshold levels is not within the predetermined range of N_thresh(K), transfer more levels from the second group to the first group until the total number of zeroed levels is within the predetermined range.

Figure 17:
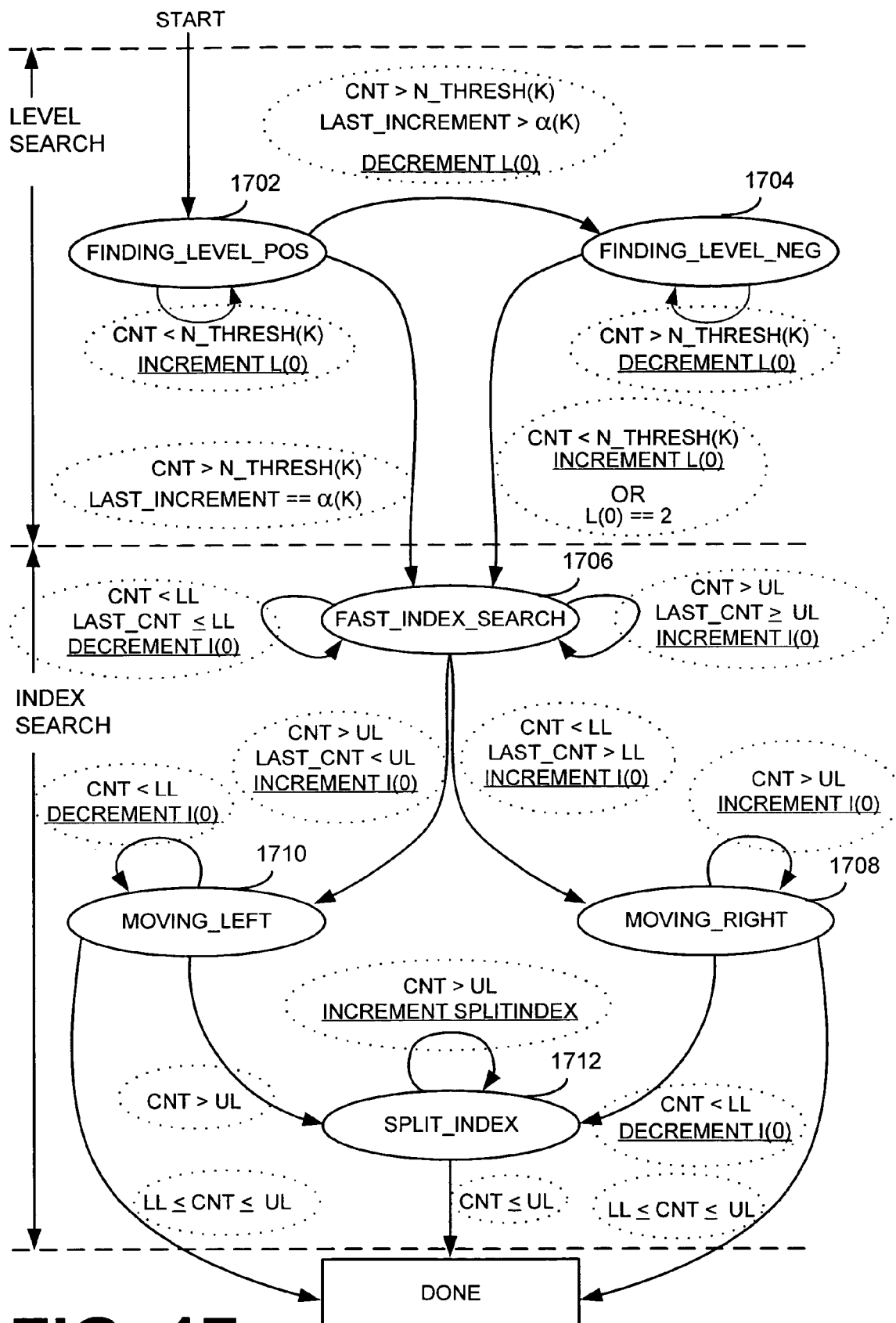
FIG. 17 is a block diagram of states of a threshold state machine.

In one preferred embodiment, the rate controller 1102 implements a state machine, the states of which are illustrated in FIG. 17, for adjusting the index and threshold levels of the threshold function. The state machine can be seen as passing through a level threshold search followed by a scan index threshold search, with states along the way. Those skilled in the art will recognize that the threshold function illustrated in FIG. 15 was an exemplary threshold function having three levels and that threshold functions having a different number of levels are intended to be within the scope of the present invention. For example, presently described hereinbelow, the rate controller 1102 implements a four level threshold function. Parameters that are used by the state machine are initialized in step 1606 and shown in Table 2.

TABLE 2

| Parameter | Value |
|---|---|
| L(0) | 2 |
| I(0) | index_thresh_min |
| SplitindexVal | 0 |
| φ | 0.05 |
| UL | (1 + φ) × N_thresh(K) |
| LL | (1 − φ) × N_thresh(K) |
| STATE | FINDING_LEVEL_POS |
| α(K) | 1 + 5// QAVG(K) |
| offset$_1$ | 8 |
| offset$_2$ | 4 |
| offset$_3$ | 6 |

The parameters are defined as follows:

L(0): level threshold of index segment 0 labeled 1510A in FIG. 15;

I(0): scan index threshold of index segment 0 labeled 1508A in FIG. 15;

SplitIndexVal: the number of levels in the first group when split indexing is performed;

φ: adjustable parameter for defining a thresholding windows;

UL: upper limit on number of number of levels thresholded to zero;

LL: lower limit on number of number of levels thresholded to zero;

α(K): α(K)=1+5//QAVG(K), where // denotes integer division with truncation and QAVG(K) is the average of the initial quantization parameters ($Q_1$) of the slice, and the parameter α(K) is used for setting level threshold for indices greater than 0; and offset$_{(1,2,3)}$: tunable parameters used for setting index thresholds for indices greater than 0.

index_thresh_min: 0 for B-frame, 1 for I or P frame

The threshold level (L) for the index segment zero of the threshold function is initialized to 2, and the remaining threshold levels of the threshold function are given as follows:

$$L(n)=L(n-1)+\alpha(K), \quad (13)$$

where n ranges from 1 to three. The levels are incremented α(K). Because α(K) is a function of QAVG(K), the average of the initial quantization parameters ($Q_1$) of the slice, the rise in the level threshold from one index segment to the next is sensitive to the quantizer scale.

The scan index theshold I(0) for the threshold function is initialized and held at index_thresh_min (I(0)=index_thresh_min) during the level search (states FINDING_LEVEL_POS and FINDING_LEVEL_NEG), and is initialized to ISTART at the start of the index search, when the state FAST_INDEX_SEARCH is entered, where ISTART is is given as follows:

$$ISTART=\gamma \times (1-R_T) \times IAVG(K) \quad (14)$$

where IAVG(K) is the average scan position of the levels in the Kth slice and γ is a tunable parameter and which is approximately 2.75

For the remaining scan index thresholds n=1 through 3, I(n) is given as follows:

$$I(n)=I(n-1)+\text{offset}_n \quad (15)$$

where offset$_n$ is specified in Table 2.

All scan index thresholds I(n) for n=0 through 3 are checked to make certain that they are less than or equal to 63 because the scan positions only run to 63. If I(n) is greater than 63, it is simply set to 63.

Referring to FIG. 17, conditional expressions are shown inside of dashed ellipses, and actions taken by the state machine are underlined. The state machine starts in the initial state 1702 which is FINDING_LEVEL_POS. STATE FINDING_LEVEL_POS:

The purpose of the initial state 1702 is to increment the level threshold L(0) until the count of the thresholded levels (cnt) exceeds the target count (N_thresh(K)), where cnt is the number of levels zeroed. In this state, the threshold function is not moved horizontally as the state machine attempts to determine the minimum threshold levels that satisfy cnt>N_thresh(K). Instead, I(0) is held at index_thresh_min and the lowest level threshold L(0) is incremented by α(K). The level thresholds L(1), L(2), and L(3) are recomputed as L(n)=L(n−1)+α(K), for n=1, 2, and 3, until the condition cnt>N_thresh(K) is met. Typically, the levels of a set of run-level pairs are populated most densely around small scan-positions, and consequently, during the index search, the cnt will be backed off of (made lesser) by sliding the threshold function to the right, e.g., making I(0)>index_thresh_min and recalculating I(1)-I(3).

To limit the number of iterations through this state, a higher increment than α(K) may be used after a predetermined number (IT) of unsuccessful iterations, where IT is a tunable parameter, e.g., IT=5. For example, if the number of iterations is greater IT, the threshold level for the index segment zero (L(0)) can be given as:

$$L(0)=L(0)+2 \times \text{iterations}. \quad (16)$$

Alternatively, a binary search can be employed. In most cases, especially in B-pictures and P-pictures where the sets of run-level pairs contain residual information, the final level threshold is often the initial guess of L(0)=2.

After the levels of the threshold function have been raised, if needed, such that the condition cnt>N_thresh(K) is met, the height of the threshold level L(0) is considered to be a minimum if the last increment was α(K). In this case, the level threshold is final and the state machine moves to the FAST_INDEX_SEARCH state 1706.

However, if instead it took a large number of iterations through this state to find L(0) and the last increment was not by α(K), then the threshold level L(0) is not a minimum. In this case, the state machine proceeds to FINDING_LEVEL_NEG state 1704.

FINDING_LEVEL_NEG:

The FINDING_LEVEL_NEG state 1704 is entered after the FINDING_LEVEL_POS state 1702 zeroed more than N_thresh(K) levels and the last increment was more than α(K). Typically, this situation occurs when there is a high number of iterations and the increment for the levels is given by equation 16.

In this situation, the threshold level L(0) is not a minimum and the FINDING_LEVEL_NEG state 1704 decrements L(0) by α(K), while holding the index threshold at index_thresh_min, until the condition cnt<N_thresh(K) is met or until the threshold level L(0) is back to its initial value. If the condition cnt<N_thresh(K) is met, then the threshold levels have been decremented too far, and in that the threshold levels are incremented by α(K).

FAST_INDEX_SEARCH:

The purpose of the FAST_INDEX_SEARCH state 1706 is to quickly find the neighborhood that the final scan index threshold is in by incrementing or decrementing the scan index threshold by a coarse increment, for example, β4. The initial scan index thresholds I(n) (n=0.3) were set in step 1606. If cnt is less than the lower limit of the index window, LL, and the value of cnt on the last iteration of the state machine (last_cnt) was less than or equal to LL, then the index threshold I(0) is decreased by β. On the other hand, if cnt is greater than the upper limit, UL, and the preceding cnt (last_cnt) was greater than or equal to UL, then the index threshold I(0) is increased by β. The other index thresholds I(n) for n=1 through 3 are set as a function of the new value of I(0) as specified in Eq. (15) earlier.

If cnt is greater than UL, but the preceding cnt (last_cnt) was less than UL, then the fast index search went too far left (towards lower frequencies). In this case, the index threshold I(0) is incremented by β−1 and the state is modified to the MOVING_LEFT state 1710.

If cnt is less than LL, but the preceding cnt (last_cnt) was greater than LL, then the fast index search went too far right (towards higher frequencies). In this case, the index threshold I(0) is decremented by β−1 and the state is modified to the MOVING_RIGHT state 1708.

MOVING_RIGHT:

When in the MOVING_RIGHT state 1708, the cnt is checked against UL. If (cnt>UL), then the scan index threshold I(0) is incremented by 1. If cnt becomes less than LL, then the MOVING_RIGHT state 1708 went one index too far. In this case, the scan index threshold I(0) is decremented by 1, and the state machine proceeds to the SPLIT_INDEX state 1712, where the SplitIndexVal is set to 8.

If neither of the above conditions are satisifed, i.e. (LL≦cnt≦UL), then the state machine proceeds to the DONE state 1714, where state machine returns the state "Done" and stops.

MOVING_LEFT:

When in the MOVING_LEFT state 1710, the cnt is checked against UL. If (cnt>UL), then the scab index threshold I(0) is incremented by 1. If cnt becomes less than LL, then the MOVING_LEFT state 1710 went one index too far. In this case, the index threshold I(0) is decremented by 1, and the state machine proceeds to the SPLIT_INDEX state 1712, where the SplitIndexVal is set to 8.

If neither of the two conditions above are met, i.e. (LL<cnt<UL), then the state machine proceeds to the DONE state 1714, where state machine returns the state "Done" and stops.

SPLIT_INDEX:

The SPLIT_INDEX state 1712 splits (or segments) the levels of the slice into two segments as defined by SplitIndexVal, so that not all levels of the slice are handeled equally. The thresholding operations up until the state machine enters the SPLIT_INDEX state have SplitIndexVal=0, so there is no split index thresholding up until this point.

One reason for the SPLIT_INDEX state 1712 is that thresholding at a particular value of I(0)=t, where t is determined by the MOVING_LEFT state 1710 or the MOVING_RIGHT state 1708, results in cnt>UL but thresholding with I(0)=t+1 results in cnt<LL. In this case, it is impossible to find a scan position for the index threshold I(0) such that cnt is within the window (LL<cnt <UL). Therefore, in the first segment of levels the index threshold I(0) is set to t, and in the second segment of the index threshold I(0) is set to t+1. If the total cnt for both segments is less than UL, then the state machine proceeds to the DONE state 1714, where state machine returns the state "Done" and stops. On the other hand, if the total cnt for both segments is not less than UL, then the SplitIndexVal is incremented so that more levels are moved from the first segment to the second segment. When cnt reaches the condition (cnt<UL), the state machine proceeds to the DONE state 1714, where state machine returns the state "Done" and stops. Hereinbelow is an exemplary code for performing split indexing over two partitions. The first partition runs from 0 to Ncoeff(K)-SplitIndexVal−1 and the second partition runs from Ncoeff(K)-SplitindexVal to Ncoeff(K)−1. The parameter SplitIndexVal controls where the dividing line between the partitions is placed. This effectively gives some fine tuning when the count of the thresholded coefficients is too large (greater than UL) at one scan index threshold but is too small (less than LL) at the neighboring index one away. Therefore, when SplitIndexVal is set to non-zero, thresholding is done with the threshold function starting at scan index I(0) for the first partition and starting at scan index I(0)+1 for the second partition.

SplitIndexVal is initialized to zero at the beginning of the slice thresholding and is modified by the state machine to move the count of thresholded coefficients within the window defined between LL and UL.

Set Rest of Level and Index Thresholds:

$$L(n)=L(n-1)+\alpha(K) \ (1 \leq n \leq 3)$$

$$I(n)=I(n-1)+\text{offset}_n, \ (1 \leq n \leq 3)$$

```
Reset Levels (Level(j) to original values
Loop w over 4 thresholds [L(0) I(0) ] to [L(3) I(3)]
{
    Loop i from 0 to Ncoeff(K) - SplitIndexVal - 1
    {
        If abs( Level(i) ) > L(n) AND Scan-Position(i) > I(n) - 1
        {
            Level(i) = 0
        }
    }
}
Loop w over 4 thresholds [L(0), I(0)] to [L(3) I(3)]
{
    Loop i from Ncoeff(K) - SplitIndexVal to Ncoeff(K) - 1
    {
        If abs( Level(i)) > L(n) AND Scan-Position(i) > I(n)
        {
            Level(i) = 0
        }
    }
}
```

Run-Level Domain Motion Compensation

Figure 18:
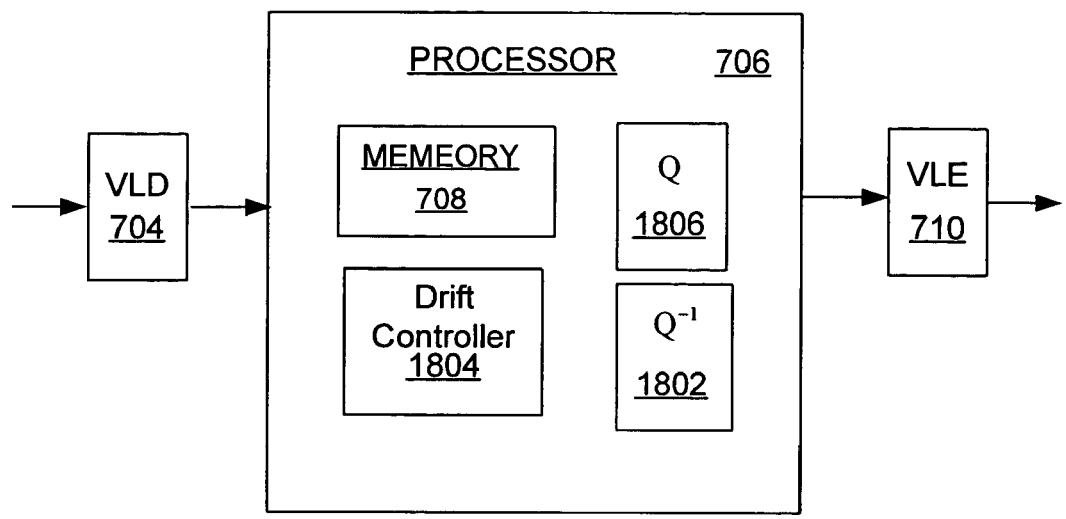
FIG. 18 is a block diagram of selected components of a transcoder.

In an alternative preferred embodiment, the run-level domain transcoder 134 not only requantizes levels and/or selectively zeros levels in the run-level domain, but also, in the run-level domain, applies motion compensation to inter-coded frames. FIG. 18 illustrates the VLD 704 and the VLE 710 and some of the functional components of that are included in the processor 706. The processor 706 includes the memory 708, an inverse quantizer 1802, a drift controller 1804, and a quantizer 1806.

The inverse quantizer 1802 receives sets of run-level pairs from the VLD 702. The levels in the sets were quantized with the quantization $Q_1$ by an upstream MPEG encoder. The inverse quantizer 1802 multiplies the levels in the sets by the quantization parameter Q1 as given is Eq. (3) according to the MPEG standards such as MPEG-2.

The drift controller 1804 receives the sets of unquantized run-level pairs, each set is denoted by {r, l}, and implements logic for opportunistic motion control in the run-level domain, which will be explained in detail hereinbelow.

The memory 708 includes DCT-domain motion compensation matrices (G), a current frame buffer, and reference frame buffers. The current frame buffer and reference frame buffers are used to buffer frames, where a frame is composed of a group of sets of run-level pairs, and where a set of run-level pairs represents a block of DCT coefficients representing a block of pixels. The processor 704 processes the current frame using the reference frames and the DCT-domain motion compensation matrices (G) as needed to, among other things, produce sets of updated run-level pairs. The quantizer 1806 quantizes the sets of updated run-level pairs using a new quantization parameter $Q_2$, and the drift controller 1804 calculates new runs for the requantized sets of run-level pairs. In the preferred embodiment the drift controller 1804 calculates the runs of the requantized sets of run-level pairs in the run-level domain using equation 7. The drift controller 1804 provides the VLE 710 with the updated requantized sets of run-level pairs, which then encodes them as previously described.

Figure 19:
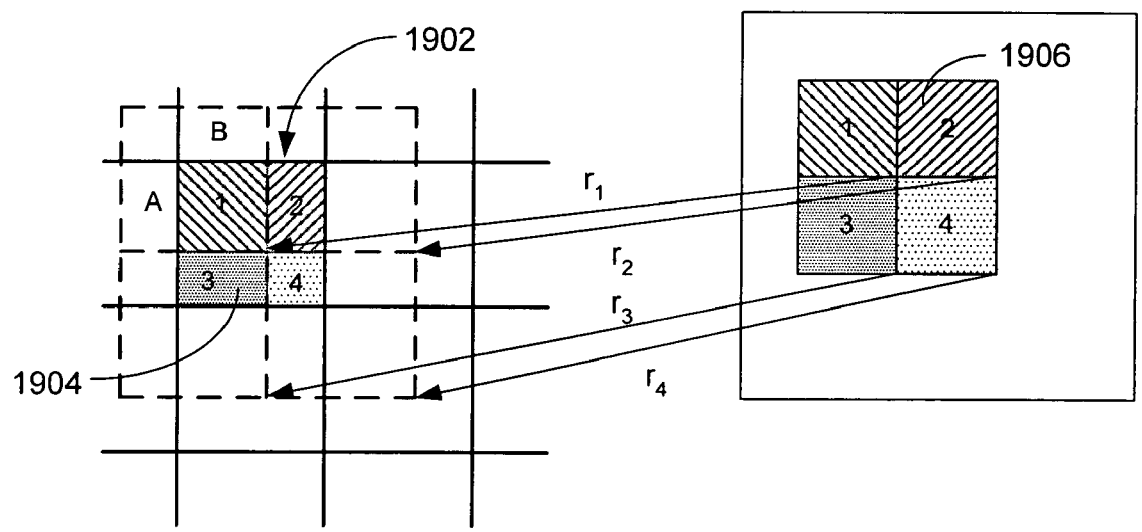
FIG. 19 is a block diagram of a motion compensated block.

As previously described an inter-coded frame is generated at an MPEG decoder by adding pixel information from blocks in a reference frame to pixels of a residual frame. The MPEG decoder uses motion vectors, which are included in the headers of the inter-coded frame, to translate a block of pixel values from a reference frame to the intercoded frame. Typically, a motion compensated block, one in which information is retrieved from one or more reference frames, is made up of portions of more than one reference block. FIG. 19 illustrates a common situation, which occurs when both components of a motion vector are not integer multiples of the block size, e.g., 8 pixels. A motion compensated block 1902 is made up of four sub-blocks 1904, which are labeled 1-4, and a residual block (not shown). Each sub-block 1904 is a portion of a reference block 1906. Sub-block 1904(1) is (A×B) in size, where "A" is the number of rows of pixels and "B" is the number of columns of pixels, and corresponds to the bottom right hand corner of reference block 1906(1); sub-block 1904(2) is (A×(8-B)) in size and corresponds to the bottom left hand corner of reference block 1906(2); sub-block 1904(3) is ((8-A)×B) in size and corresponds to the top right hand corner of reference block 1906(3); and sub-block 1904(4) is ((8-A)×(8-B)) in size and corresponds to the top left hand corner of reference block 1906(4). The motion vectors, $r_1$-$r_4$, translate the reference blocks 1906(1)-1906(4) such that the sub-blocks 1904(1)-1904(4) are appropriately positioned.

In matrix form, the motion compensated block 1902 is denoted by $d^{mc}$ and is given by the following equation:

$$d^{mc} = \sum_{i=1}^{4} d_i, \quad (17)$$

where $d_i$ is an 8×8 matrix given by the following equation:

$$d_i = h_i^{nr} b_i w_i^{nc}, \quad (18)$$

where $b_i$ is the $i^{th}$ reference block 1906, nr and nc are the number of rows and columns, respectively, of the sub-block 1904(i), and $h_i^{nr}$ and $w_i^{nc}$ are of the form of upper and lower diagonal matrices having identity sub-matrices. The h matrices for the four sub-blocks 1904 are as follow:

$$h_1^{nr} = \begin{bmatrix} 0 & I^{nr} \\ 0 & 0 \end{bmatrix}, h_2^{nr} = \begin{bmatrix} 0 & I^{nr} \\ 0 & 0 \end{bmatrix}, h_3^{nr} = \begin{bmatrix} 0 & 0 \\ I^{8-nr} & 0 \end{bmatrix}, \text{ and } h_4^{nr} = \begin{bmatrix} 0 & 0 \\ I^{8-nr} & 0 \end{bmatrix};$$

and the w matrices are as follows:

$$w_1^{nc} = \begin{bmatrix} 0 & 0 \\ I^{nc} & 0 \end{bmatrix}, w_2^{nc} = \begin{bmatrix} 0 & I^{8-nc} \\ 0 & 0 \end{bmatrix}, w_3^{nc} = \begin{bmatrix} 0 & 0 \\ I^{nc} & 0 \end{bmatrix}, \text{ and } w_4^{nc} = \begin{bmatrix} 0 & I^{8-nc} \\ 0 & 0 \end{bmatrix}.$$

Applying the discrete cosine transform to equation 18 yields:

$$DCT(d) = \sum_{i=1}^{4} DCT(d_i) = \sum_{i=1}^{4} DCT(h_i^{nr}) DCT(b_i) DCT(w_i^{nc}) \quad (19a)$$

$$D = \sum_{i=1}^{4} D_i = \sum_{i=1}^{4} H_i^{nr} B_i W_i^{nc}, \quad (19b)$$

because the $h_i^{nr}$ and $w_i^{nc}$ matrices are unitary orthogonal, the DCT operation is distributive. All of the matrices in equations 17-19 are 8×8 in size, and consequently, by arranging the elements of the D, $D_i$, and $B_i$ matrices in a predetermined order, such as the scan order shown in FIG. 3A, each component of equation 19b can be rewritten as $$D'_i = G_i(H_i^{nr}, W_i^{nc}) B'_i, \quad (20)$$

where the primed matrices are 64×1 in size and G, which is a function of the $H_i$ and $W_i$ matrices, is a 64×64 matrix that is calculated from the $H_i$ and $W_i$ matrices, and where the subscript "i" refers to the $i^{th}$ reference block. As shown in FIG. 19, "i" normally runs from 1-4. However, for the sake of clarity the subscript "i" will be dropped, which means that the magnitude of the components of the motion vector, which extends from the reference frame to the current frame, are each an integral number of blocks.

Consider matrices a, b, c, d and e, which are all the same size (N×N), where $$a = cbd = (cb)d = ed, \quad (21)$$

and the (n,m) component of matrix a is given by $$a_{n,m} = \sum_{\alpha=0}^{N-1} e_{n,\alpha} d_{\alpha,m} = \sum_{\beta=0}^{N-1} \sum_{\alpha=0}^{N-1} c_{n,\beta} b_{\beta,\alpha} d_{\alpha,m}. \quad (22)$$

Each element in the a and b matrices have a one-to-one mapping into scan order arrays, and the first element of the scan order array ($a_0 = a_{0,0}$) is the following:

$$a_o = \sum_{\beta=0}^{N-1} \sum_{\alpha=0}^{N-1} c_{0,\beta} d_{\alpha,0} b_{\beta,\alpha} = \sum_{\gamma=0}^{N^2-1} f_{0,\gamma} b'_\gamma. \quad (23)$$

Each element of f is determined on a term by term basis according to scan order. For example, using the scan order illustrated in FIG. 3A and N=8, $b_o=b_{0,0}$, $b_1=b_{0,1}$, $b_2=b_{1,0}$, ... $b_{63}=b_{7,7}$, then $f_{0,0}=c_{0,0}d_{0,0}$, $f_{0,1}=c_{0,0}d_{1,0}$, $f_{0,2}=c_{0,1}d_{0,0}$, ... and $f_{0,63}=c_{0,7}d_{7,0}$.

In a similar fashion, the elements of the G matrix, which for the purposes of this disclosure is called a DCT-domain motion compensation (MC) matrix, are found. In one preferred embodiment, the memory 708 includes a complete set of G matrices to account for all possible integer pixel sub-block placements within the motion compensated block. As those skilled in the art are well aware, MPEG-2 allows for half pixel translations of a sub-block, which are accomplished through a linear combination of integer pixel translations. For the sake of clarity, motion vectors that translate a block of pixels from a reference frame into an inter-coded frame are considered to be integer translations, but those skilled in the art understand half-integer translations, and such translations are considered to be within the scope of the invention.

In an alternative preferred embodiment, the memory 708 includes a complete set of partial matrices, which are denoted as G'. In this embodiment, the partial matrices, G', are truncated versions of complete 64×64 G matrices. The G' include lower frequency components of the complete G matrices. Even though the use of G' results in the loss of motion compensation for some high frequencies, the quality of service for the user should not be substantially affected because the human eye is less responsive to changes in high frequency. Of course, the quality of service will depend upon the amount of truncation in the G', and the size of G' is determined by the operator of the STS 100.

Equation 20 provides the basis for performing DCT-domain motion compensation. However, the output of the VLD 704 includes sets of run-level (RL) pairs 216, which are of the form $[r_0, l_0, r_1, l_1, \ldots r_{n-1}, l_{n-1}, r_n, l_n]^T$, which is short form for a 64 element array consisting of zeroes and non-zero coefficients in scan order. Thus, in order to use equation 13, sets of run-level pairs need to be expanded into 64 element arrays. Instead of expanding sets of run-level pairs and then doing matrix multiplication, a computationally efficient way of calculating motion compensation for a given set of run-level pairs can be employed using information from the given set of run-level pairs. First, the $G(H^{nr}, W^{nc})$ matrix defines column arrays $g^n(H^{nr}, W^{nc})$, i.e., $$G(H^{nr}, W^{nc}) = [g^0(H^{nr}, W^{nc}), g^1(H^{nr}, W^{nc}), \ldots, g^{63}(H^{nr}, W^{nc})], \quad (24)$$

where $g^n(H^{nr}, W^{nc})$ is the nth column of $G(H^{nr}, W^{nc})$. For the given set of run-level pairs, a scan-position array is associated with the set of run-level pairs and the elements of the scan-position array are given by equation 6. A modified sub-matrix G', which is made up of selected columns of the $G(H^{nr}, W^{nc})$ matrix, is determined based upon the scan positions. The selected columns are determined from the following equation:

$$n = r_0, \quad (25a)$$

for the first selected column and $$n = i_{n-1} + r_n + 1, \quad (25b)$$

for subsequent columns, where "$i_n$" is the $n^{th}$ element of the scan-position array, and $r_n$ the $n^{th}$ element of the run array. For example, consider the exemplary set of run-level pairs illustrated in FIG. 4B and the corresponding run array 1002, level array 1004, and scan-position array 1006, which are illustrated in FIG. 10A. For this example, the modified sub-matrix G' is as follows:

$$G' = [g^0, g^2, g^6, g^7, g^9, g^{10}, g^{13}, g^{19}], \quad (26)$$

where the selected columns correspond to the values of the level array 1004, then $$D = G'L, \quad (27)$$

where L is the level array matrix 1004.

Run-Level Domain Motion Compensation

Figure 20:
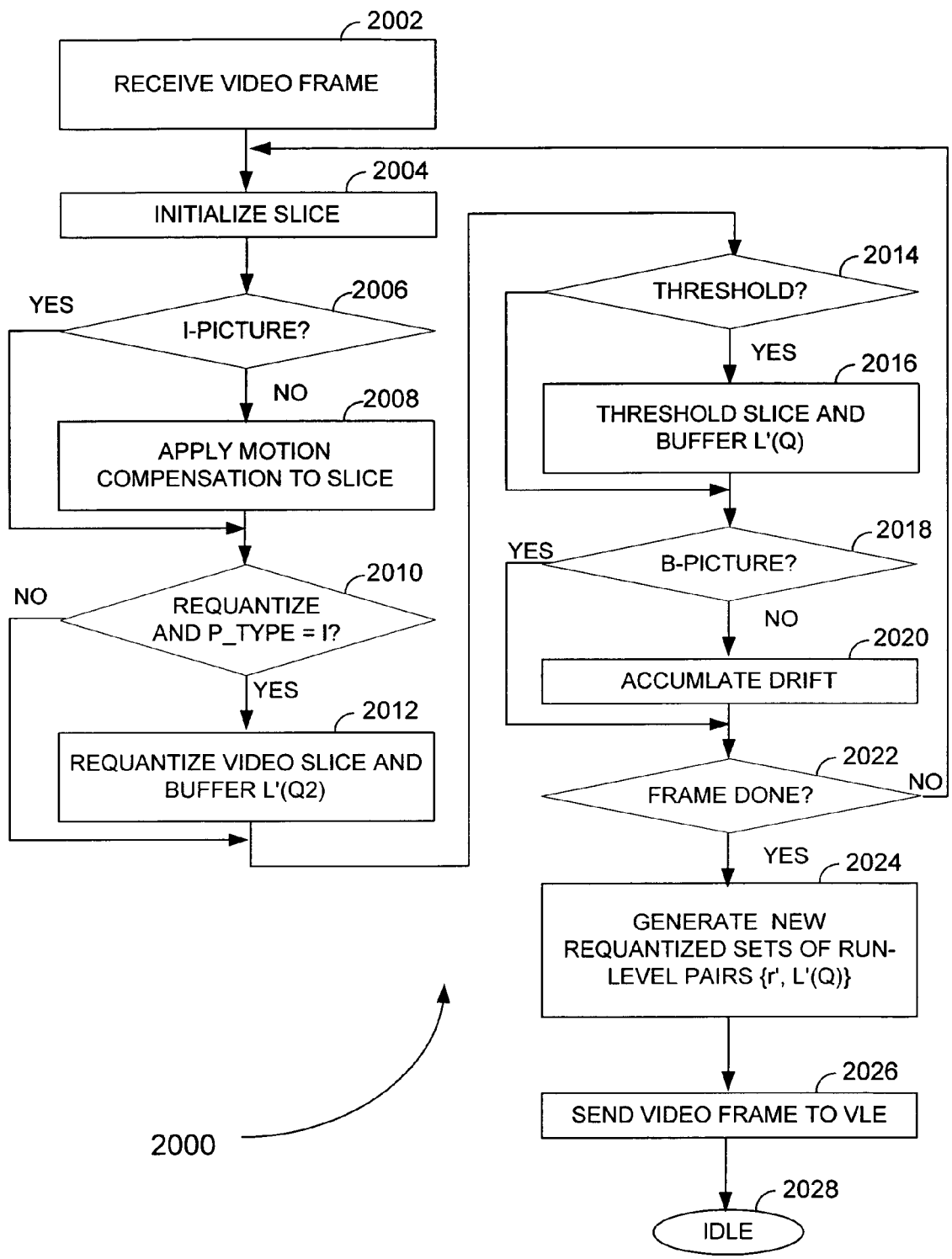
FIG. 20 is a flow chart of steps taken in requantizing and thresholding a digital stream.
Figure 21:
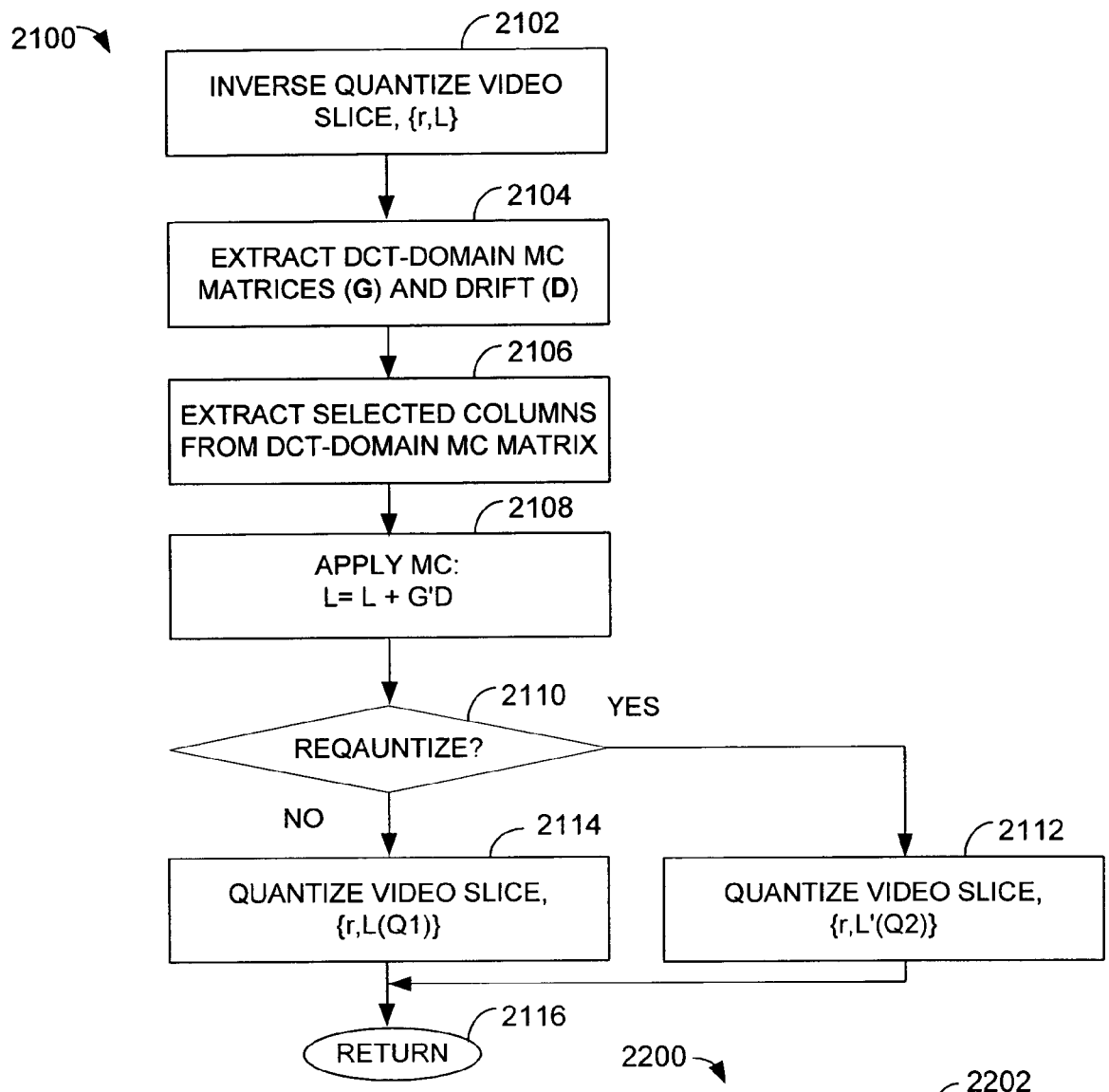
FIG. 21 is a flow chart of steps taken in motion compensation.
Figure 22:
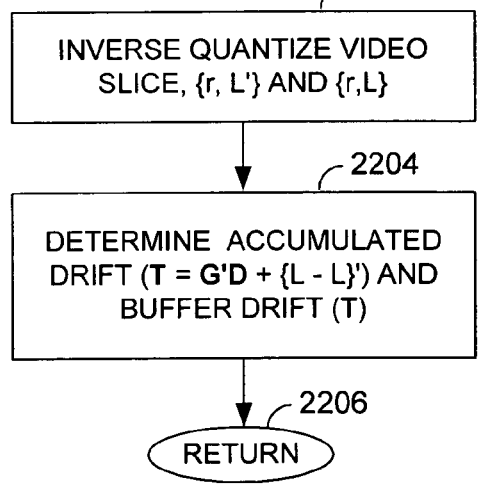
FIG. 22 is a flow chart of steps taken in accumulating drift.

FIGS. 20-22 illustrate exemplary logic that is implemented by the run-level domain transcoder 134 for applying motion compensation in the run-level domain to frames that are transcoded. In FIG. 20, steps 2000 illustrate one embodiment, among others, for applying a motion compensation scheme within the transcoder 134, responsive to the transcoder 134 selectively reducing the bit size of a frame using either requantization or thresholding or both requantization and thresholding. In FIG. 21, non-limiting exemplary steps 2100 illustrate one embodiment of the motion compensation scheme. In FIG. 22, non-limiting exemplary steps 2200 illustrate one embodiment of accumulating drift, which is introduced by requantization or thresholding or both requantization and thresholding and which is used in the motion compensation scheme illustrated in FIG. 21. In FIGS. 20-22, levels that have been processed by requantization, wherein the quantization parameter has been changed from $Q_1$ to $Q_2$, and levels that have been processed by thresholding are denoted with primes, e.g., l', whereas, levels that have not been requantized (change of quantization parameter) or have not been thresholded are not primed, e.g., l.

Referring to FIG. 20, in step 2002 the processor 706 receives a current frame from the VLD 704. The current frame includes, among other things, headers, and sets of quantized run-level pairs denoted by $\{r, l(Q_1)\}$. If the current frame is inter-coded, it also includes among other things motion vectors. A consequence of requantization and/or thresholding is a drift in the levels of inter-coded frames. In a conventional transcoder that converts a frame back into pixel domain values, the drift is compensated by peforming standard motion compensation on the difference of the pre-transcoded and transcoded reference frames, and performing a DCT of the result. The accumulated drift (D) is made up of sets of accumulated drift, each set corresponding to a macroblock of pixels, wherein the sets of accumulated drift are in the run-level domain. Each set of accumulated drift has a scan-position array associated with it. When an I-picture, the first picture in a GOP, is received, the accumulated drift (D) is set to zero. After the I-picture has been processed by requantization and/or thresholding, the drift for each set of run-level pairs, i.e., the difference between the incoming levels and the processed levels, is determined, and the scan-positions of drift are then determined. Alternatively, the scan-positions of the incoming levels can be used for the scan-positions of the drift. In that case, for a particular set of drifts, the drift associated with a particular scan position will be zero, if the incoming level and the processed level did not change. The accumulated drift (D) is buffered and used to correct inter-coded frames.

In step 2004, the drift controller 1804 initializes the parameters used for processing a slice of the current frame. Among other things, the drift controller 1804 determines the amount of bits to shave off of the current slice and initializes quantization parameters and thresholding parameters. In step 2006, the drift controller 1804 determines whether the current frame is an I-picture. If the current frame is an I-picture, the drift controller 1804 proceeds to step 2008 and applies motion compensation to the current slice of the current frame. Typically, P-pictures and B-pictures are also requantized as part of motion compensation and will be discussed hereinbelow. After determining that the current frame is an I-picture, or after determining the current frame is not an I-picture and applying motion compensation on the current slice of the current frame, the drift controller 1804 proceeds to step 2010 and determines whether to requantize the slice and whether the current frame is an I-picture. The drift controller 1804 proceeds to step 2012 only if both conditions are met, i.e., that the current frame is an I-picture and that it should be requantized. As previously described hereinabove, the determination to requantize or not is preferably based upon multiple parameters such as, but not limited, the reduction threshold ($R_T$), picture type, the maximum initial quantization parameter, and other parameters. As will be explained hereinbelow, if the current frame is a B-picture or P-picture, then as part of the motion compensation performed in step 2008 the drift controller 1804 determines whether to requantize the current slice, and if so, requantizes the current slice.

In step 2014, the drift controller 1804 determines whether to threshold the current slice. Typically, as previously described the decision to threshold or not is based in part upon parameters such as the reduction threshold ($R_T$), the number of bits saved by requantization, and the average of the absolute values of the levels. However, other parameters including fewer parameters, different parameters or more parameters can also be used in the determination for thresholding.

If the rate controller 1804 decides to threshold the current slice the drift controller 1804 proceeds to step 2016 and thresholds the current slice. In one preferred embodiment, the thresholding is performed using the thresholding logic illustrated in FIG. 16 along with the state machine illustrated in FIG. 17. It should be noted that the levels after thresholding are denoted as L' (Q) (where Q is either $Q_1$, the initial quantization parameter, or $Q_2$, the final quantization parameter). If the levels of the current slice were not requantized, then they are functions of $Q_1$, and if they were requantized, then they are function of $Q_2$.

After thresholding, or not thresholding, the drift controller 1804 proceeds to step 2018 and determines whether the current frame is a B-picture, and if so proceeds to step 2020 and accumulates the drift in the levels caused by requantization and/or thresholding. The drift is accumulated throughout a group of pictures and reset to zero at the beginning of a new group of pictures.

In step 2022, the drift controller 1804 determines whether the current slice was the last slice of the current frame, and if so, proceeds to step 2024. On the other hand, if the current slice is not the last slice of the current frame, the drift controller 1804 returns to step 2004 and continues to process the slices of the current frame until finished.

In step 2024, the drift controller 1804 updates the runs of the processed sets of run-level pairs {r, l' (Q)} to produce new sets of processed run-level pairs, which are denoted by {r', l'(Q)} and updates the accumulated drift if the current frame is a reference frame, e.g., an I-Picture or a P-Picture. The updating of the accumulated drift is done by buffering the current accumulated drift (T), which was calculated in step 2020, into the accumulated drift (D). In one preferred embodiment, the requantization and thresholding are done in parallel, and the calculations of the new runs associated with the processed levels (requantized and/or thresholded levels) is done in parallel. In one preferred embodiment, the drift controller 1804 employs equations 6 and 7 in the calculations of the new runs.

In step 2026, the processor 706 sends the processed run-level pairs {r', l'(Q)} of the current frame to the VLE 710 for processing. In one preferred embodiment, the processed run-level pairs {r', l'(Q)} includes updated run values (r') that are associated with levels having non-zero values and original run values (r) that are associated with levels that have the value of zero. In this case, the VLE 710 is adapted to ignore run-level pairs in which the level is zero, i.e., a run-level pair denoted as (r,0).

Referring to FIG. 21, steps 2100 illustrate an exemplary method of applying motion compensation in the run-level domain. In step 2102, the drift controller 1804 inverse quantizes the levels of the slice to produce unquantized levels, which are denoted as 1. Motion compensation and drift accumulation, which is illustrated in FIG. 22, are preformed on unquantized levels.

In step 2104, the drift controller 1804 extracts DCT domain MC matrices (G) and selected sets of accumulated drift (D) from the memory 708. Each of the DCT domain MC matrices in the memory 708 is associated with a motion vector, and the drift controller 1804 uses the motion vectors for the macro-blocks of the current slice to determine which DCT domain MC matrices (G) to extract. The selected sets of accumulated drift correspond to the reference frame blocks for motion compensated blocks of the current frame, and the drift controller 1804 uses the header information of the current frame to determine which set of accumulated drift ($D_i$) to extract, where "i" denotes that the set of accumulated drift corresponds to the "$i^{th}$" block of the reference frame. Motion vectors of the current frame map sets of accumulated drift to sets of run-level pairs of the current frame. When the current frame is a P-Picture, the sets of accumulated drift are from the preceding reference frame such as an I-Picture or P-Picture. When the current frame is a B-Picture, the sets of accumulated drift are selected from the preceding reference frame such as an I-Picture or P-Picture, and from the subsequent P-Picture reference frame. In the preferred embodiment, the drift controller 1804 extracts associated scan-position arrays 1006 for each extracted set of accumulated drift.

In step 2106, for each extracted set of accumulated drift, $D_i$, the drift controller 1804 uses the associated scan-position array to extract selected columns of from its associated DCT domain MC matrix (G) to produce modified sub-matrices (G'). The columns of the modified sub-matrices G' are determined from the scan-position arrays. The drift controller 1804 also associates scan-position arrays with sets of run-level pairs {r, l} of the current slice. The elements of the scan-position array are the scan position of the non-zero DCT coefficients for each set of run-level pairs. If the scan pattern for the current frame is not the reference scan pattern, then the scan-positions are mapped into scan-positions of the current frame. In other words, a particular scan pattern such as the scan pattern illustrated in FIG. 3A is the reference, or default, scan pattern, and if the scan pattern of the changes, then the scan pattern is remapped to correspond to the reference scan pattern.

In step 2108, for each set of run-level pairs {r, l} of the current slice the drift controller 1804 calculates motion compensation for the accumulated drift by matrix multiplication of the modified sub-matrix G' with the associated set of accumulated drift D and the product (G'D) is added to the unquantized levels. The product (G'D) and the unquantized level (l) are then buffered in memory 708. Typically, as illustrated in FIG. 19, a block in the current frame receives information from four blocks in a reference frame, and consequently, for a set of levels $$1 = l + \sum_{i=1}^{4} G'_i D_i.$$

Conceptually, the modified sub-matrix G' maps accumulated drift associated with a block in reference frame into a motion compensated block of the current frame.

In one preferred embodiment, an opportunistic scheme is employed such that a given set of run-level pairs {r, l} is equal to the given set of run-level pairs {r, l} plus the motion compensated accumulated drift, where only like scan positions of the motion compensated accumulated drift are added to the given set of current run-level pairs {r, l}. Opportunistic addition is performed so that the sets of run-level pairs do not have to be expanded into full length arrays, i.e., 64 element arrays, in order to add the motion compensated drift (G'D) to the levels.

In step 2110, the drift controller 1804 determines whether the current slice should be requantized. Typically, the decision to requantize or not is performed using the logic previously described hereinabove.

In step 2112, the quantizer 1806 requantizes the levels of the current slice using the quantization parameter $Q_2$. The requantized sets of run-level pairs are denoted by {r, l'($Q_2$)}. On the other hand, if the drift controller 1804 had determined not to requantize the current slice, then in step 2114, the quantizer 1806 requantizes the levels of the current slice using the quantization parameter $Q_1$. After the unquantized levels have been converted back into quantized levels, l(Q), the drift controller 1804 is done with motion compensation.

FIG. 22 illustrates exemplary steps taken by the drift controller 1804 to accumulate drift. In step 2202, the drift controller 1804 inverse quantizes the processed levels (l'(Q)) to produce unquantized processed levels (l') for each set of levels in the current slice. If the current frame is an I-Picture, then the drift controller 1804 inverse quantizes the initial quantized levels (l'($Q_1$)) to produce unquantized non-processed levels (l) for each set of levels in the current slice. However, if the current frame is not an I-Picture, then unquantized non-processed levels (l) were produced and buffered when motion compensation was applied in step 2108. In that case, the unquantized non-processed level (l) of the current slice are extracted from the memory 708.

In step 2204, the drift controller 1804 calculates the current accumulated drift that is associated with each set of run-level pairs in the current slice, and buffers the current accumulated drift in a temporary array (T). For a given set of levels in the current slice, the current accumulated drift is sum of the motion compensation of the accumulated drift, (G'D), from prior reference frames, plus the instantaneous drift, the difference in the unquantized non-processed levels (l) and the unquantized processed levels (l'), i.e., $$T = (l - l') + \sum_{i=1}^{4} G'_i D_i.$$

The accumulated drift from prior reference frames (D) is not updated until the entire current frame has been processed, so that the accumulated drift does not include artifacts of the current frame.

In one preferred embodiment, the memory 708 includes buffers for at least two frames worth of drift so that it can include drift for both the immediately preceding reference frame (an I-Picture or P-Picture) and the current reference frame (a P-Picture) in order to properly process B-Pictures.

In one preferred embodiment, the drift for different types of frames such as video-frames, top video-fields, and bottom video-fields are accumulated in memory 708 separately. In this embodiment, the processor 706 determines whether the current frame is a video-frame, i.e., non-interlaced, or a top video-field, or a bottom video-field using the header information of the current frame and then extracts the appropriate sets of drift from the memory 708 for motion compensation and updates the appropriate sets of drift.

It should be emphasized, that for the sake of clarity, the steps of motion compensation were described in a sequential manner. However, as those skilled in the art will recognize, the steps could be implemented in a different order and/or in parallel. In one preferred embodiment, steps such as, but not limited to, quantizing, inverse quantizing, calculation of new run values, and linear operations of matrices are done in parallel in enhance computational efficiency. Furthermore, it should be noted that the motion compensation is performed in the run-level domain because the sets of run-level pairs are not expanded into DCT-domain matrices. Thus, computational efficiency is had by not inverse scanning sets of run-level pairs into DCT-domain matrices and, then after processing, scanning the DCT-domain matrices back into sets of run-level pairs.

In one preferred embodiment, the motion compensation is implemented using expanded level arrays, which are 64×1 in size. In this embodiment, the sets of quantized run-level pairs {r, l($Q_1$)}, the sets of unquantized run-level pairs {r, l}, the sets of requantized run-level pairs {r, l'($Q_2$)}, and the sets of unquantized-requantized run-level pairs {r', l'} are expanded such that the levels are now in scan order. Because the various sets of run-level pairs are expanded, the matrix operations in steps 2014, 2026, and 2034 are done for each level according to scan order.

In one preferred embodiment, B-Pictures are processed without motion compensation. In other words, for a B-Picture steps 2100 are skipped over. Motion compensation of B-Pictures can be skipped because B-Pictures are not used as reference pictures and any drift error in the B-Pictures is not accumulated and, consequently, is used in the motion compensation of subsequent pictures. Since many MPEG-2 streams contain a majority of B-Pictures, computational efficiency is enhanced by not doing motion compensation for B-Pictures.

Although exemplary preferred embodiments of the present invention have been shown and described, it will be apparent to those of ordinary skill in the art that a number of changes, modifications, or alterations to the invention as described may be made, none of which depart from the spirit of the present invention. Changes, modifications, and alterations should therefore be seen as within the scope of the present invention. It should also be emphasized that the above-described embodiments of the present invention, particularly, any "preferred embodiments" are merely possible non-limiting examples of implementations, merely setting forth a clear understanding of the principles of the inventions.

What is claimed is:

1. An apparatus in a network for transcoding a digital stream of compressed frames, the apparatus comprising:
a decoder adapted to decompress a frame having content information and non-content information included therein into the run-level domain, wherein the content-information carried by the frame is represented in run-level domain;
a processor adapted to
determine the number of bits to shave ($N_S$) from the frame;
process the frame in the run-level domain to reduce the compressed bit size of the frame by approximately $N_s$ bits, wherein the content-information of the frame is changed from initial content information to final content information;
determine whether to requantize at least a given portion of the frame based on a reduction threshold determined from the number of bits to shave from the given portion of the frame and an initial content size for the given portion;
responsive to determining to requantize at least the given portion of the frame, requantize in the run-level domain at least the given portion of the frame;
determine whether to threshold at least the given portion of the frame;
responsive to determining to threshold at least the given portion of the frame, threshold in the run-level domain at least the given portion of the frame;
determine the number of bits to shave from the given portion of the frame ($N_{SHAVE}$);
determine for the given portion the initial content size ($S_{INT}$) of the portion of the frame, which is defined as the number of bits representing the given portion when the initial content information of the given portion of the frame is compressed; and
determine a reduction threshold ($R_T$), wherein the reduction threshold is given as $R_T = N_{SHAVE}/S_{INT}$, and wherein the determination whether to requantize is based at least in part upon the reduction threshold; and
an encoder adapted to compress the frame.

2. The apparatus of claim 1, wherein the frame is made up of multiple blocks arranged in a sequence, and each block is represented by at least one set of run-level pairs, and the given portion of the frame is represented by at least one set of run-level pairs.

3. The apparatus of claim 2, wherein the given portion of the frame is a slice of the frame, and each set of run-level pairs representing a block of the slice is processed in parallel.

4. The apparatus of claim 1, wherein the processor is further adapted to determine the total content size ($C_T$) of the frame, wherein the total content size ($C_T$) is defined as the number of bits of the content information when the content information is compressed, and wherein the number of bits to shave ($N_{SHAVE}$) from the given portion is related to the product of the initial content size ($S_{INT}$) times the quotient of number of bits to shave ($N_S$) from the frame divided by total content size ($C_T$) of the frame.

5. The apparatus of claim 4, wherein the processor is further adapted to:
parse the frame into a plurality of N portions, wherein the given portion of the frame is the $k^{th}$ portion of the frame to be processed; and
determine an accumulated reduction error (E), wherein the accumulated reduction error is defined as the sum of the difference between a desired bit reduction and the actual bit reduction for each of the already processed portions of the frame, wherein the desired bit reduction for each previously processed portion is defined as the number of bits to shave ($N_{SHAVE}$) from the previously processed portion, and wherein the actual bit reduction for each previously processed portion is defined as the difference between the final compressed content size of the previously processed portion minus the initial compressed content size of the previously processed portion, and wherein the number of bits to shave ($N_{SHAVE}$) from the given portion is given by the equation $N_{SHAVE} = (S_{INT} \times N_S/C_T) + E/(N+1-k)$.

6. The apparatus of claim 5, wherein the processor is further adapted to:
determine for the given portion the final content size ($S_{FNL}$) of the given portion of the frame, which is defined as the number of bits representing the given portion when the final content information of the given portion of the frame is compressed;
determine an instantaneous reduction error (e), wherein the instantaneous reduction error is defined as the sum of the final content size ($S_{FNL}$) plus the number of bits to shave ($N_{SHAVE}$) from the given portion minus the initial content size ($S_{INT}$), $e = S_{FNL} + N_{SHAVE} - S_{INT}$, wherein the instantaneous reduction error (e) is added to the accumulated reduction error (E).

7. The apparatus of claim 1, wherein the processor is further adapted to determine a target number ($N_{THRESH}$) of levels to set to zero by thresholding levels of the given portion, wherein the frame is made up of multiple blocks arranged in a sequence, and each block is represented by at least one set of run-level pairs, and the given portion of the frame includes at least one set of run-level pairs.

8. The apparatus of claim 7, wherein the target number ($N_{THRESH}$) of levels is related to the number of levels in the given portion of the frame and the reduction parameter ($R_T$).

9. The apparatus of claim 7, wherein the processor is further adapted to determine for the given portion the initial content size ($S_{INT}$) of the portion of the frame, which is defined as the number of bits representing the given portion when the initial content information of the given portion of the frame is compressed, and wherein the target number ($N_{THRESH}$) of levels is related to the product of the number of levels in the given portion of the frame times the quotient of the reduction parameter ($R_T$) divided by the initial portion content size ($S_{INT}$).

10. The apparatus of claim 7, wherein the given portion of the frame includes multiple sets of run-level pairs, and wherein the processor is further adapted to:
associate a scan position with each level in the given portion;
determine the number of levels (CNT) beneath a threshold function having a predetermined width and height profile, wherein a particular level is beneath the threshold function responsive to the scan position of the particular level being greater than a specific scan position and responsive to the magnitude of the particular level being less than a particular height;
responsive to the number of levels (CNT) beneath the threshold function being within a predetermined range of the target number ($N_{THRESH}$), set the magnitude of the levels beneath the threshold function to zero; and
responsive to the number of levels (CNT) beneath the threshold function being outside of the predetermined range of the target number ($N_{THRESH}$), adjust the threshold function.

11. The apparatus of claim 10, wherein the processor adjusts the threshold function by changing the height profile of the threshold function.

12. The apparatus of claim 11, wherein the height profile is increment.

13. The apparatus of claim 11, wherein the height profile is decrement.

14. The apparatus of claim 10, wherein the threshold function extends over a first range of scan positions and the processor adjusts the threshold function by shifting the relative location of the threshold function such that the threshold function extends over a second of range of scan positions.

15. The apparatus of claim 14, wherein the largest scan position included in the first range of scan positions is smaller than the largest scan position included in the second range of scan positions.

16. The apparatus of claim 14, wherein the largest scan position included in the first range of scan positions is greater than the largest scan position included in the second range of scan positions.

17. The apparatus of claim 10, wherein the threshold function extends over a first range of scan positions and to adjusts the threshold function the processor is adapted to:
partition the levels of the given portion into a first group and a second group of levels;
associate a second threshold function with the second group of levels, wherein the second threshold function extends over a second range of scan positions;
(a) determine the number of levels (CNT1) beneath the first threshold function, wherein a first particular level is beneath the first threshold function responsive to the scan position of the first particular level being with the first range of scan positions and responsive to the magnitude of the first particular level being less than a first specific height;
(b) determine the number of levels (CNT2) beneath the second threshold function, wherein a second particular level is beneath the second threshold function responsive to the scan position of the second particular level being with the second range of scan positions and responsive to the magnitude of the second particular level being less than a second specific height;
(c) responsive to the sum of CNT1 and CNT2 being within the predetermined range of the target number ($N_{THRESH}$), set the magnitude of the levels beneath the first and second threshold functions to zero;
(d) responsive to the sum of CNT1 and CNT2 being outside of the predetermined range of the target number ($N_{THRESH}$), transfer a predetermined number of levels from the first group to the second group; and wherein responsive to the sum of CNT1 and CNT2 being outside of the predetermined range of the target number ($N_{THRESH}$), the processor includes logic to repeat (a), (b), (c), and (d) until the sum of CNT1 and CNT2 is within the predetermined range of the target number ($N_{THRESH}$).

18. An apparatus in a network for transcoding a digital stream of compressed frames, the apparatus comprising:
a decoder adapted to decompress a frame having content information and non-content information included therein into the run-level domain, wherein the content-information carried by the frame is represented in run-level domaim;
a processor adapted to
determine the number of bits to shave ($N_S$) from the frame;
process the frame in the run-level domain to reduce the compressed bit size of the frame by approximately $N_s$ bits, wherein the content-information of the frame is changed from initial content information to final content information;
determine whether to requantize at least a given portion of the frame based on a reduction threshold determined from the number of bits to shave from the given portion of the frame and an initial content size for the given portion;
determine whether to requantize at least a given portion of the frame;
responsive to determining to requantize at least the given portion of the frame, requantize in the run-level domain at least the given portion of the frame;
determine whether to threshold at least the given portion of the frame; and
responsive to determining to threshold at least the given portion of the frame, to threshold in the run-level domain at least the given portion of the frame;
determine the number of bits to shave from the given portion of the frame ($N_{SHAVE}$);
determine for the given portion the initial content size ($S_{INT}$) of the portion of the frame, which is defined as the number of bits representing the given portion when the content information of the given portion of the frame is compressed;
determine for the given portion the final content size ($S_{FNL}$) of the portion of the frame, which is defined as the number of bits representing the given portion when the content information of the given portion of the frame is compressed;
determine a reduction error (e) for the given portion of the frame; wherein the reduction error (e) given as, $e=S_{FNL}+N_{SHAVE}-S_{INT}$; and
accumulate the reduction error with reduction errors from previously processed portions of the frame, wherein the accumulated reduction error is used in processing subsequent portions of the frame; and
an encoder adapted to compress the frame.

19. The apparatus of claim 1, wherein to determine the number of bits to shave ($N_S$) from the frame the processor is further adapted to:
determine total size ($N_T$) of the frame, wherein the total size ($N_T$) is number of bits of the frame when the frame is compressed, and wherein number of bits to shave ($N_S$) is defined as the difference between the total size ($N_T$) and a desired size ($N_D$), $N_S=N_T-ND$.

20. A method a transcoding a digital stream, the method comprising the steps of:
receiving in a first bit stream a compressed frame having compressed content information and non-content information therein, the compressed frame having a first bit size ($N_{T1}$), and the compressed content information having a first bit size ($C_{T1}$);
determining an approximate number of bits to shave ($N_S$) from the compressed frame,
decoding the compressed frame such that the frame is represented by initial content information formatted in sets of run-level pairs, wherein each set of run-level pairs is defined by a set of levels and an associated set of runs;
associating a scan position with a level in a set of run-level pairs; decomposing the sets of run-level pairs into sets of levels and sets of runs;

processing the sets of levels and the sets of runs of the frame in a domain defined by run and level to generate final content information representing the frame; and encoding the frame using the final content information, wherein the bit size of the encoded final content information is approximately given by $C_{T1}-N_S$.

21. The method of claim 20, further including the steps of:
(a) parsing the frame into a plurality of portions, each portion having at least set of run-level pairs;
(b) buffering a copy of a given portion;
(c) thresholding in the run-level domain the levels in the given portion of the frame; and
(d) calculating new run values for the runs in the thresholded given portion.

22. The method of claim 21, wherein the step of processing further includes the steps of:
(e) determining a set of threshold differences (D) by subtracting the levels in the thresholded given portion from the levels in the buffered copy of the given portion;
(f) buffering the set of threshold differences;
(g) determining for each level of the given portion the scan position thereof
(h) associating a scan-position array with the set of threshold differences (D), wherein the elements of the scan-position array include the determined scan positions; and
(i) buffering the scan-position array.

23. The method of claim 22, wherein the step of processing further includes the steps of:
(j) determining the number of levels, which have the value of zero and which precede the first non-zero level, in the thresholded given portion of the frame; and
(k) determining the number of levels, which have the value of zero and which interpose non-zero levels, in the thresholded given portion of the frame.

24. The method of claim 23, wherein the given portion of the frame is a first set of run-level pairs, and the scan position value of the $n^{th}$ element of the scan-position array is determined using the equation $i_n = r_n + i_{n-1} + 1$, for $n>0$, and $i_n = r_n$, for n=0, where $r_n$ is the value of the $n^{th}$ run in the associated set of runs.

25. The method of claim 24, wherein the new run value for the $n^{th}$ run of the set of runs associated with the first set of run-level pairs is calculated using the equation $r'_n i_n - i_{n-k(n)-1} - 1$, for $k(n)<n$, $r'_n = i_n$, for $k(n)=n$ where k(n) is the number of levels that were set to zero interposing the nth level and the first preceding thresholded non-zero level, i(n) is the scan position of the $n^{th}$ level of the given set of levels, and $r'_n$ is the new run value for the $n^{th}$ level.

26. The method of claim 22, wherein steps (b) through (i) are repeated for each set of portion of the frame, and further including the steps of:
(j) determining a second approximate number of bits to shave ($N_{S2}$) from a second compressed frame, (k) decoding the second compressed frame such that the second frame is represented by initial content information formatted in sets of run-level pairs, wherein each set of run-level pairs is defined by a set of levels and an associated set of runs, and wherein the compressed size of the content information is $C_{T2}$;
(l) applying motion compensation to the sets of run-level pairs of the second frame using at the sets of threshold differences (D) to produce therefrom motion compensated content information;
(m) thresholding the motion compensated content information of the second frame to produce therefrom final content information for the second frame; and
(n) encoding the final content information for the second frame, wherein the size of the encoded final content information for the second frame is approximately given by $C_{T2}-N_{S2}$.

27. The method of claim 26, wherein step (l) further includes the steps of:
(o) extracting a particular set of threshold differences from the buffer using header information of the second frame;
(p) matrix multiplying the particular set of threshold differences with a particular DCT-domain motion compensation matrix (G) to produce therefrom a set of motion compensated threshold differences (T);
(q) adding the set of motion compensated threshold differences (T) to levels of the second frame;
(r) thresholding in the run-level domain the levels in a second given portion of the second frame; and
(s) calculating new run values for levels in the second portion.

28. The method of claim 27, wherein the particular DCT-domain motion compensation matrix (G) is selected from a set of DCT-domain motion compensation matrices using a motion vector of the second frame.

29. The method of claim 27, wherein each element of the set of motion compensated thresholded differences (T) is associated with a scan position, and wherein step (q) further includes the step of:
(t) determining for each level of the second given portion the scan position thereof; and
(u) opportunistically adding the elements of the set of motion compensated threshold differences (T) to the levels of the second given portion, wherein only when the scan position that is associated with a particular element of the set of motion compensated threshold differences (T) matches the scan position of a particular level is the particular element of the set of motion compensated threshold differences (T) added to the particular level.

30. The method of claim 27, wherein step (l) further includes the steps of:
(t) determining whether the second frame is a reference frame;
(u) responsive to determining the second frame is a reference frame, updating a particular set of threshold differences (D).

* * * * *